United States Patent [19]

Gulledge

[11] Patent Number: 5,490,204
[45] Date of Patent: Feb. 6, 1996

[54] AUTOMATED QUALITY ASSESSMENT SYSTEM FOR CELLULAR NETWORKS

[75] Inventor: Kenneth G. Gulledge, Arlington Heights, Ill.

[73] Assignee: SAFCO Corporation, Chicago, Ill.

[21] Appl. No.: 204,619

[22] Filed: Mar. 1, 1994

[51] Int. Cl.⁶ .................................................. H04M 11/00
[52] U.S. Cl. ................................................................ 379/59
[58] Field of Search ................................. 379/59, 34, 27, 379/29, 1, 22, 24, 416; 455/33.1, 67.1, 67.4, 54.2

[56] References Cited

U.S. PATENT DOCUMENTS

| | | | |
|---|---|---|---|
| 4,554,410 | 11/1985 | Furumoto | 379/27 |
| 4,613,990 | 9/1986 | Halpern | 455/33 |
| 5,134,643 | 7/1992 | Iwata | 379/27 |

*Primary Examiner*—Edward L. Coles, Sr.
*Assistant Examiner*—Jerome Grant, II
*Attorney, Agent, or Firm*—Augustus G. Douvas

[57] ABSTRACT

An automated system that assesses the quality of service provided by a cellular radiotelephone system. The system uses apparatus located at a mobile station that remotely controls apparatus located at a fixed station. A cellular radiotelephone call is placed from the mobile station which is received at the fixed station. When the connection is established, commands are sent from the mobile station to the fixed station that configure and control the operation of the fixed station. Many calls between the mobile station and the fixed station are placed and received by the mobile station each under control of the mobile station. During each call, recordings are made of the progress of the call and the audio quality measurements obtained during the call from both the mobile and fixed stations perspectives. Audio quality measurements are made utilizing enhanced audio quality measurement techniques that allows simultaneous measurements of audio quality in both the uplink and downlink channels of a cellular radiotelephone call utilizing two test tones instead of the single test tone that is normally used. The results of a number of cellular radiotelephone calls are later combined to form a set of statistical indicators that effectively represent the quality of service provided by a cellular radiotelephone system. The system provides means for comparing the quality of service provided by competing cellular radiotelephone service providers and for comparing the quality of service provided by differing cellular radiotelephone technology types.

12 Claims, 31 Drawing Sheets

Call Totals

|  | A Band | B Band |
|---|---|---|
| Total Calls | 96 | 95 |
| Good Calls | 79 | 79 |
| Blocked Calls | 0 | 2 |
| Dropped Calls | 3 | 0 |
| Noisy (forward) | 8 | 7 |
| Noisy (reverse) | 4 | 6 |
| Noisy (total) | 12 | 11 |
| No Service | 1 | 2 |
| Roam | 0 | 0 |
| Excessive Handoff | 0 | 1 |
| Loud Adjacents | 0 | 1 |
| SAT Fade | 0 | 0 |

FIG. 26A

Call Percentages

|                    | A Band | B Band |
|--------------------|--------|--------|
| Good Calls         | 82%    | 83%    |
| Blocked Calls      | 0%     | 2%     |
| Dropped Calls      | 3%     | 0%     |
| Noisy (total)      | 13%    | 12%    |
| No Service         | 1%     | 2%     |
| Roam               | 0%     | 0%     |
| Excessive Handoff  | 0%     | 1%     |
| Loud Adjacents     | 0%     | 1%     |
| SAT Fade           | 0%     | 0%     |

FIG. 27A

| Daily Analysis A vs B | | | | |
|---|---|---|---|---|
| A Band Total | 11/1/93 | 11/2/93 | 11/3/93 | 11/4/93 |
| Total Calls | 20 | 38 | 22 | 16 |
| Good Calls | 15 | 33 | 18 | 13 |
| Blocked Calls | 0 | 0 | 0 | 0 |
| Dropped Calls | 1 | 1 | 1 | 0 |
| Noisy (forward) | 2 | 2 | 3 | 1 |
| Noisy (reverse) | 2 | 1 | 0 | 1 |
| Noisy (total) | 4 | 3 | 3 | 2 |
| No Service | 0 | 0 | 0 | 1 |
| Roam | 0 | 0 | 0 | 0 |
| Excessive Handoff | 0 | 0 | 0 | 0 |
| Loud Adjacents | 0 | 0 | 0 | 0 |
| SAT Fade | 0 | 0 | 0 | 0 |
| | | | | |
| A Band Percentages | 11/1/93 | 11/2/93 | 11/3/93 | 11/4/93 |
| Good Calls | 75% | 87% | 82% | 81% |
| Blocked Calls | 0% | 0% | 0% | 0% |
| Dropped Calls | 5% | 3% | 5% | 0% |
| Noisy (total) | 20% | 8% | 14% | 13% |
| No Service | 0% | 0% | 0% | 6% |
| Roam | 0% | 0% | 0% | 0% |
| Excessive Handoff | 0% | 0% | 0% | 0% |
| Loud Adjacents | 0% | 0% | 0% | 0% |
| SAT Fade | 0% | 0% | 0% | 0% |
| | | | | |
| B Band Total | 11/1/93 | 11/2/93 | 11/3/93 | 11/4/93 |
| Total Calls | 20 | 38 | 22 | 15 |
| Good Calls | 15 | 33 | 20 | 11 |
| Blocked Calls | 0 | 0 | 1 | 1 |
| Dropped Calls | 0 | 0 | 0 | 0 |
| Noisy (forward) | 4 | 1 | 1 | 1 |
| Noisy (reverse) | 2 | 3 | 0 | 1 |
| Noisy (total) | 5 | 3 | 1 | 2 |
| No Service | 0 | 1 | 0 | 1 |
| Roam | 0 | 0 | 0 | 0 |
| Excessive Handoff | 1 | 0 | 0 | 0 |
| Loud Adjacents | 0 | 0 | 0 | 1 |
| SAT Fade | 0 | 0 | 0 | 0 |
| | | | | |
| B Band Percentages | 11/1/93 | 11/2/93 | 11/3/93 | 11/4/93 |
| Good Calls | 75% | 87% | 91% | 73% |
| Blocked Calls | 0% | 0% | 5% | 7% |
| Dropped Calls | 0% | 0% | 0% | 0% |
| Noisy (total) | 25% | 8% | 5% | 13% |
| No Service | 0% | 3% | 0% | 7% |
| Roam | 0% | 0% | 0% | 0% |
| Excessive Handoff | 5% | 0% | 0% | 0% |
| Loud Adjacents | 0% | 0% | 0% | 7% |
| SAT Fade | 0% | 0% | 0% | 0% |

FIG. 28

AUTOMATED QUALITY ASSESSMENT SYSTEM FOR CELLULAR NETWORKS

FIELD OF THE INVENTION

The present invention relates to point to point wireless communications systems including cellular radiotelephone communication systems. More specifically, this invention relates to methods and apparatus for providing automated assessment of the quality of service provided by cellular radiotelephone communication systems.

BACKGROUND OF THE INVENTION

The basic structure and operation of a cellular radiotelephone system are well known and have been disclosed in a number of publications. See, for example the January 1979 issue of The Bell Systems Technical Journal; and Specification EIA IS-3B entitled "Cellular System Mobile Station—Land Station Compatibility Specification" (July, 1984, Electronic Industries Association). 12 Signal-strength analyzers are employed in the prior art to measure and report signal strength information of the radio frequency communication channels which are used in cellular radiotelephone systems. This information is used to ensure reliable operation over the service provider's coverage area. In mature cellular radiotelephone systems, where the cell sites have grown to be very dense, the measurement of signal strength alone is not enough to ensure the reliable operation of the cellular system.

Providers of cellular radiotelephone service need to ascertain whether or not high quality cellular service is being provided to all areas where the cellular radiotelephone system provides service. Current means for determining the quality of service provided by a cellular radiotelephone system are manually intensive requiring a person at the mobile and fixed stations of a cellular radiotelephone conversation. These people place and receive cellular radiotelephone calls, monitor the progress of the call, rate the clarity of the audio for the call, note the graphical location of the mobile station call, and record success or failure for each call placed or received.

This technique of measuring cellular radiotelephone system quality is very tedious, and is highly susceptible to human error especially after long periods of data collection. The manual rating of the audio quality during each cellular radiotelephone call is especially vulnerable to human interpretation. One person may rate the audio quality of a call acceptable while another person would rate the audio quality of the same call unacceptable. Of even greater concern, the same person may rate equal audio quality acceptable one day and unacceptable the next day.

Additionally, when competitive comparisons between multiple cellular radiotelephone service providers are required or when differing cellular radiotelephone technologies need to be compared, multiple sets of people need to be employed to complete each comparison.

Therefore, cellular radiotelephone service providers need to rely upon automated, in-field, geographically-located recordings of call progress and measurements of the cellular radiotelephone audio quality to either verify high quality cellular coverage or identify problem areas which need attention. The measurement of cellular radio telephone system quality needs to be repeatable between days, weeks, months and even years of testing for statistical accuracy.

SUMMARY OF THE INVENTION

Accordingly, a principal object of the present invention is to provide improved methods and apparatus for an automated system for assessing the quality of service provided by a cellular radiotelephone system.

It is another object of the present invention to provide improved methods and apparatus for measuring the audio quality of a cellular radiotelephone call in both the uplink and downlink channels simultaneously utilizing digital signal processing techniques.

It is a further object of the present invention to provide improved methods and apparatus for providing a statistical analysis of the quality of service assessment.

It is an additional object of the present invention to provide improved methods and apparatus for making competitive and technological comparisons of the quality of service provided by different cellular radiotelephone communication systems.

The principal structural features for attaining the objects of this invention are summarily outlined in the following paragraphs. Other secondary features are described in the section entitled Detailed Description of the Preferred Embodiment.

The present invention provides improved and automated methods and apparatus for assessing the quality of the service provided by a cellular radiotelephone system. This is accomplished by utilizing apparatus that places and receives cellular radiotelephone calls, monitors and records the progress of each call, determines and records the audio quality obtained during each call, rates and records the quality of each individual call based on the call progress and obtained audio quality from both the mobile and fixed stations perspectives, and combines the results of a number of cellular radiotelephone calls to form a set of statistical indicators that effectively represent the quality of service provided by a cellular radiotelephone system. In addition, all of the collected data are geodeticly referenced to the location of the mobile station which provides information needed to analyze and correct problems identified within the cellular radiotelephone system.

The assessment of the quality of service provided by a cellular radio system is completed in two steps.

In step one, automated apparatus places and receives cellular radiotelephone calls between a mobile station and a fixed station at specified time intervals and call duration. The operation of the fixed station is remotely controlled by the mobile station, thus providing a system that can be operated by a single operator. The operator configures the parameters needed for the cellular radiotelephone quality of service assessment and begins the assessment at the mobile station and the collection of data is then totally automatic. The operator then has the option of moving the mobile station anywhere within the service area provided the cellular system in order to assess the quality of service provided within the said service area.

During the cellular radiotelephone calls the clarity of the audio channel is measured at both the mobile station and the fixed station utilizing Digital Signal Processing (DSP) techniques which remove any human interpretation of the audio quality of the call and thus provides repeatability of the measurements from call to call. The DSP audio measurement subsystems present at both the mobile and fixed ends of the cellular radiotelephone utilize enhancements to well known methods of audio quality measurement. The enhancements allow audio quality measurements to be made simultaneously at both the mobile and fixed ends of the cellular radiotelephone call. The preferred embodiment teaches that the well known SINAD and C notched noise audio measurement techniques can be enhanced to simultaneously measure audio quality at both ends of a cellular radiotelephone call by utilizing two audio tones instead of the single tone that is normally used.

The progress of each call is also monitored for any of the well known cellular radiotelephone system anomalies that could contribute to poor cellular radiotelephone system quality. These anomalies —blocked calls, dropped calls, calls with SAT fades, calls with strong adjacent channel signal strength, calls with excessive handoffs, no service call attempts, and ROAM call attempts are recorded together with the measured audio quality in order to assess the quality of service provided by the cellular radiotelephone system under evaluation.

The second step in the assessment of the quality of service provided by a cellular radio system is completed by combining the results recorded by the mobile station and the fixed station. The combination is accomplished by matching the time of day of the recordings made by the apparatus controlling the mobile and fixed stations. Once the data are matched statistical tables and graphs are created that provide the information needed to grade the quality of service provided by the cellular radiotelephone system. Maps are also created that indicate the geographic areas where problems exist and corrections to the cellular radiotelephone system are needed.

The present invention also provides methods and apparatus for supporting multiple mobile stations and fixed stations which provides support for simultaneous data collections comparing competing cellular radiotelephone systems and differing cellular radiotelephone technology types while still utilizing only a single operator.

BRIEF DESCRIPTION OF THE DRAWINGS

In order that all of the structural and functional features for attaining the objects of the Automated Quality Assessment System for Cellular Networks may be readily understood, detailed reference is herein made to the accompanying drawings, wherein:

FIG. 26A shows a typical call totals table output from the OQA system.

FIG. 27A shows a typical call percentages table output from the OQA system.

FIG. 28 shows a typical periodic table output from the OQA system; and

DETAILED DESCRIPTION OF THE PREFERRED EMBODIMENT

Figure 1:
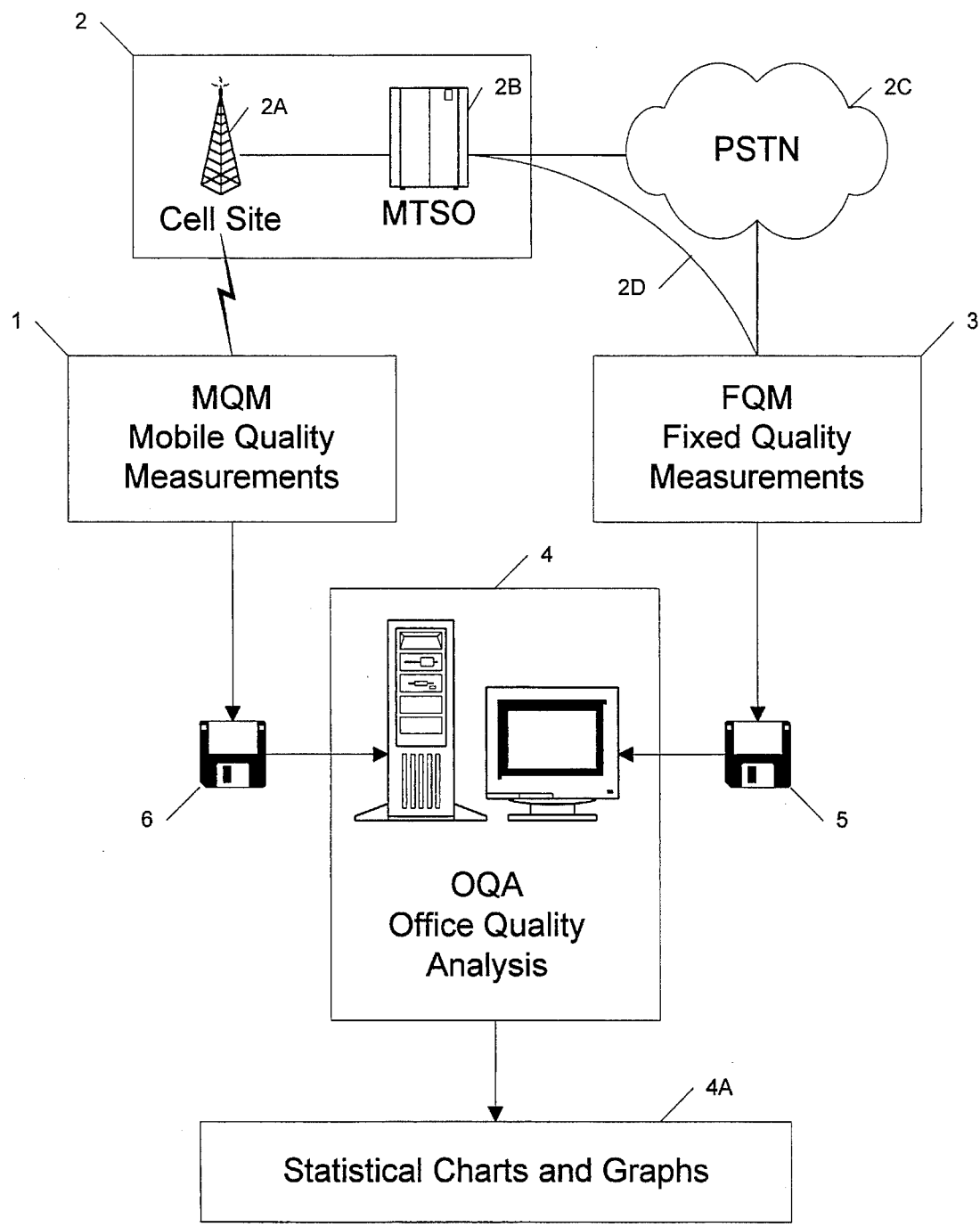
FIG. 1 shows a simplified block diagram, illustrating the three principal components of Automated Quality Assessment System for Cellulat Networks namely, 1 ) Mobile Quality Measurement (MQM) system, 2) Fixed Quality Measurement (FQM) system, and 3) Office Quality Analysis (OQA) system.

The following paragraphs describe in detail the methods and apparatus utilized in the currently preferred embodiment to perform an assessment of the quality of service provided by a cellular radiotelephone system. The currently preferred embodiment in shown as a simplified block diagram in FIG. 1. The Automated Quality Assessment System for Cellular Networks, hereafter referred to as AQAS, consists of three principal components—the Mobile Quality Measurement system 1, hereafter referred to as MQM, the Fixed Quality Measurement system 3, hereafter referred to as FQM, and the Office Quality Analysis system 4, hereafter referred to OQA. The MQM 1 contains, monitors and controls one or more cellular radiotelephone mobile stations. The FQM 3 provides service as one or more fixed telephone stations and can be either attached to Public Switched Telephone Network 2C, hereafter referred to as PSTN, or to dedicated terminations 2D within the Mobile Telephone Switching Office 2B, hereafter referred to as MTSO. Cellular radiotelephone calls are placed between the MQM 1 and FQM 3 through the cellular radiotelephone system infrastructure 2. Data are collected by the MQM 1 and the FQM 3 specific to the progress and audio quality obtained by each cellular radio telephone call placed. At the conclusion of a test the data collected by the MQM 1 and the FQM 3 are transferred to the OQA 4 through data paths 5 and 6. The OQA 4 then matches the data collected by the MQM 1 and the FQM 3 based on the time or day of the collection to produce statistical tables and graphs 4A that represent the quality of the cellular service provided during the test. Many sets of test data collected throughout the coverage area of a cellular radiotelephone system may be combined to form a comprehensive view of the quality of service provided by the cellular radiotelephone system being assessed.

Figure 2:
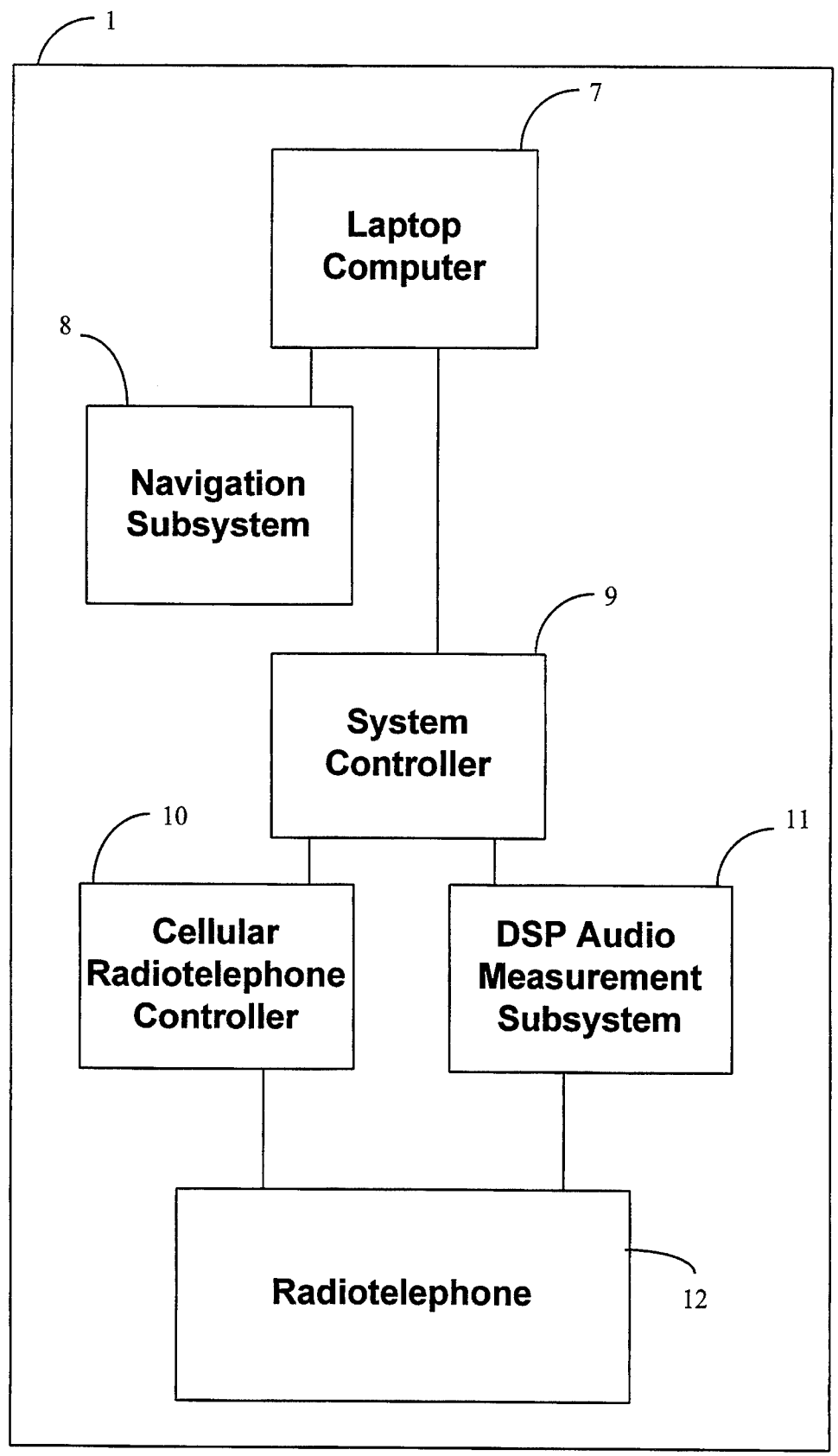
FIG. 2 shows a simplified block diagram of the Mobile Quality Measurement (MQM) system 1 of FIG. 1.

FIG. 2 shows a simplified block diagram of the MQM system 1 of FIG. 1. Referring to FIG. 2, The MQM consists of a laptop computer 7 which is used for the user interface and data storage, a navigation subsystem 8 which is used for geodetic positioning, a system controller 9 which is used for communication and real time control of the data collection process, a cellular radiotelephone controller 10 which is used to control the attached cellular radiotelephone, an DSP audio quality measurement 11 subsystem which is used to measure the clarity of the audio during a cellular radiotelephone, and a one or more cellular radiotelephones 12 which provide mobile terminal access to the cellular radiotelephone system.

The laptop computer 7 can be any commercially available laptop computer that has 2 serial ports and is capable of running the Microsoft Windows operating environment. For this preferred embodiment the laptop computer used is the GRiDCASE 1550sx.

The navigation subsystem 8 can be any source of navigation information that is capable of providing position via a RS232 serial port. For this preferred embodiment the navigation subsystem used is the BOSCH Travelpilot.

The system controller 9 can be any controller that can provide a serial interface to the laptop computer 7 and provide control functions to the cellular radiotelephone controller 10 and the audio measurement subsystem 11. For this preferred embodiment the system controller is a Mizar MZ8115 single board computer.

The cellular radiotelephone controller 10 can be any cellular radiotelephone controller that allows control and monitoring of the cellular radiotelephone to which it is connected. Control and monitoring of cellular radiotelephones is well known, for example see U.S. Pat. No. 5,289,526 Chymyck and Lemke issued February 1994. For this preferred embodiment a controller from the prior art is employed. This controller allows control and monitoring of up to 4 cellular radiotelephones utilizing the Motorola three wire bus interface. For additional information on the Motorola three wire bus interface see U.S. Pat. No. 4,369,516.

The cellular radio telephone 12 can be any cellular radiotelephone that can be externally controlled and monitored by a computer interface. For this preferred embodiment any Motorola cellular radiotelephone that utilizes the aforementioned three wire bus interface can be utilized.

The DSP audio measurement subsystem 11 can be any commercially available digital signal processor with related analog to digital and digital to analog converters. All of which are well known. For this preferred embodiment the Spectrum Signal processing DBV31A Floating Point Processor is utilized. Attached to this DSP processor are two Spectrum DB242A Dual Channel ADC & DAC cards each of which provides two analog inputs and two analog outputs and thus allows connection of up to four cellular radiotelephones. The received audio from each cellular radiotelephone is connected to one of the four available analog inputs. Audio tones generated by the DSP system are input into each radiotelephone via one of the four available analog outputs. Connections to the cellular radiotelephone are made through the speaker and microphone connections.

Figure 3:
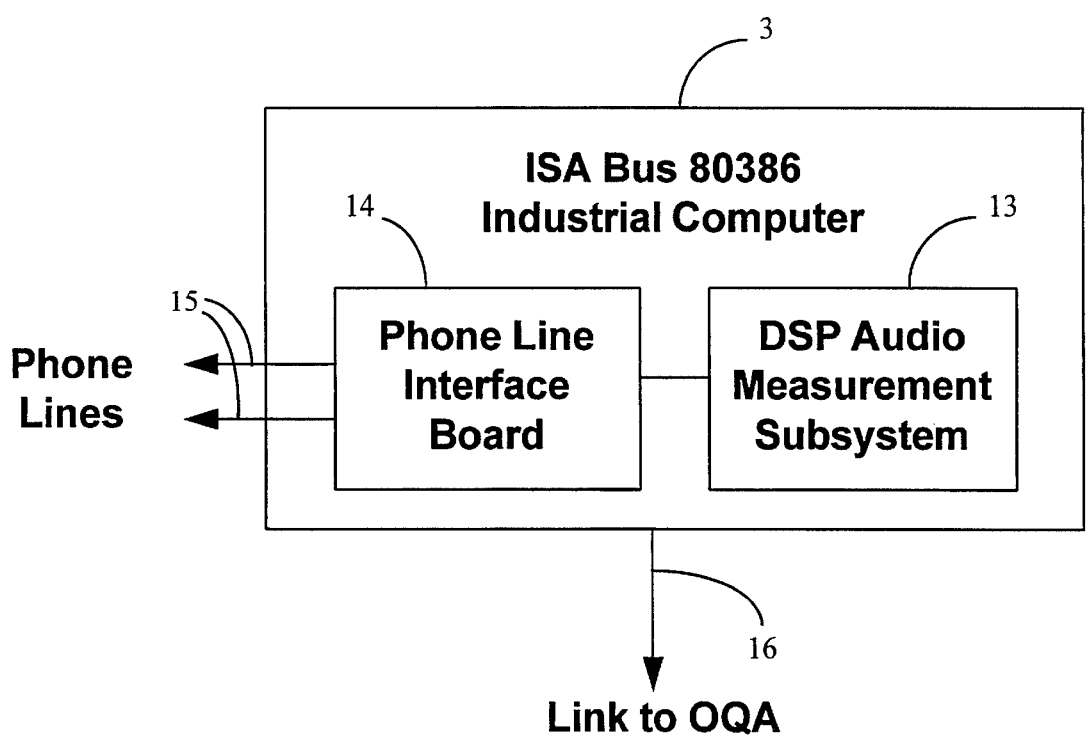
FIG. 3 shows a simplified block diagram of the Fixed Quality Measurement (FQM) system 2 of FIG. 1.

FIG. 3 shows a simplified block diagram of the FQM system 3 of FIG. 1. Referring to FIG. 3, The FQM consists of a Industry Standard Architecture, hereafter referred to as (ISA), 80386 based industrial computer which is used as the enclosure and main controller for the FQM system, one or more phone line interface boards 14 which provide interconnection to the phone lines 15, a DSP audio measurement subsystem 13 which makes audio quality measurements and a link to the OQA 16.

The industrial computer 3 is equipped with a 200 MB fixed disk drive not shown which provides data and program storage. The computer also provides the limited user interface that is required in the FQM system. This interface provides a indication that the data collection process is running. Under normal conditions no user interface is required with the FQM system as it is remotely controlled by the MQM system.

The phone line interface board 14 provides interconnection between the phone lines and the audio measurement subsystem. Each phone line interface board provides two phone line connections. For this preferred embodiment up to four phone line interface boards can be utilized allowing a FQM system that will handle a total of eight phone lines.

The audio measurement subsystem 13 can be any commercially available digital signal processor with related analog to digital and digital to analog converters. All of which are well known. For this preferred embodiment the Spectrum Signal processing TMS320C31 Real-Time Applications board is utilized. Attached to this DS P board are 2 Spectrum AM/D 16DS Crystal Analog Daughter Modules each of which provides two analog inputs and two analog outputs. Two DSP cards can be used allowing concurrent processing for up to eight analog inputs and outputs. Each DSP board is coupled to two phone line interface boards, again providing support for up to eight phone lines.

The link to the OQA 16 can be a simple data transfer via a magnetic disk, a serial connection via a cable or modem or a link via a local or wide area network. For this preferred embodiment the transfer is accomplished via a magnetic disk or a local area network.

Figure 4:
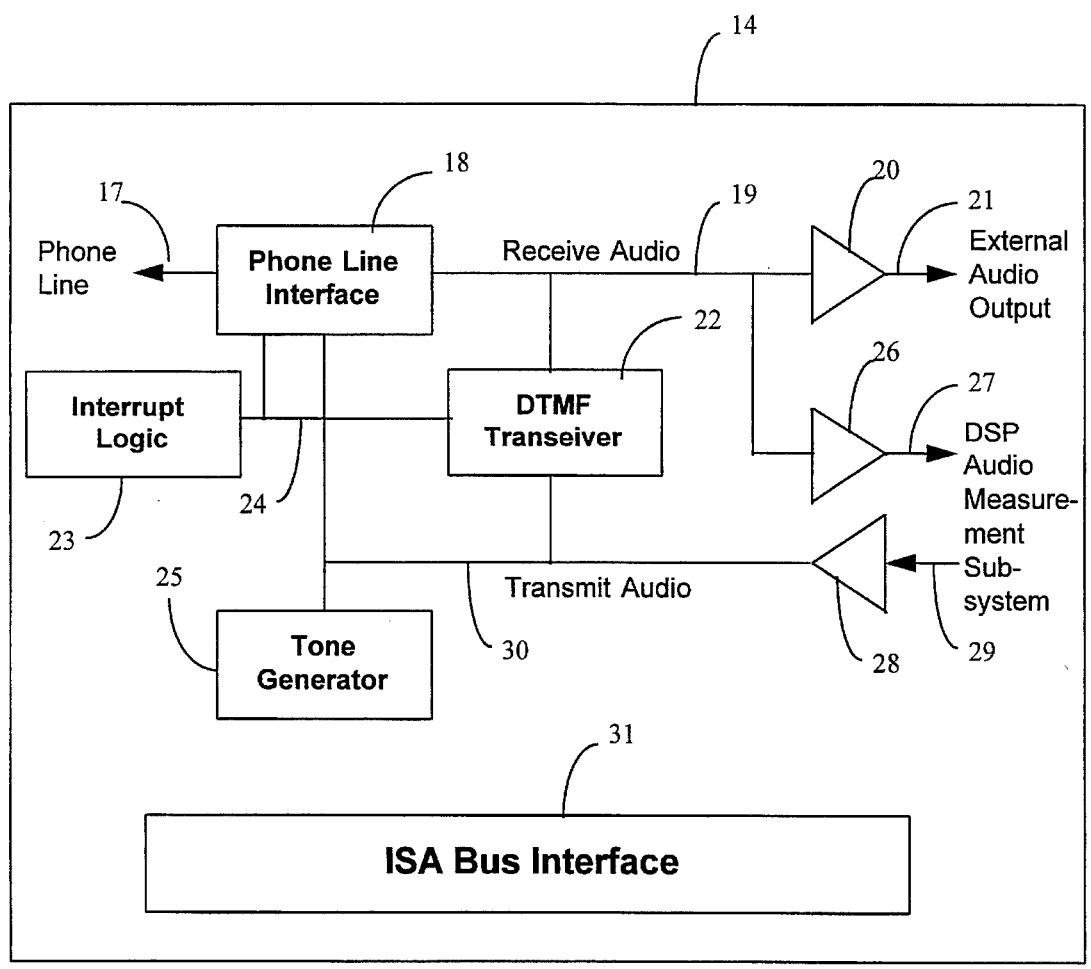
FIG. 4 shows a simplified block diagram of the Phone Line interface board 14 of FIG. 3.

FIG. 4 shows a simplified block diagram of the phone line interface board. For clarity only one of two parallel channels are shown. Each phone line 17 is attached to a FCC approved phone line interface module 18 that separates the two wire phone line into transmit 30 and receive 19 audio channels. The receive audio 19 is routed to the input of a Dual Tone Multiple Frequency, hereafter referred to as DTMF, transceiver 22 and two programmable gain amplifiers 20,26. One of the programmable gain amplifiers 20 is used to provide an external audio output 21. The other programmable gain amplifier 26 is used to provide audio to the DSP audio measurement subsystem 27. Input to the transmit audio 30 is provided by a programmable tone generator 25, the output of the DTMF transceiver 22 and a programmable gain amplifier 28 that inputs audio generated by audio measurement subsystem 29.

The DTMF transceiver 22 is used to decode messages sent to the FQM system by the MQM system. After a message from the MQM system has been successfully decoded the DTMF transceiver 22 is again used to acknowledge the successful message receipt. If a message is not successfully decoded no response is given.

The hardware tone generator 25 is used when the audio measurement technique that is currently being utilized requires a tone to be transmitted from the FQM system to the MQM system. The utilization of a hardware tone generator on the phone interface board frees the DSP audio measurement subsystem from the processing overhead required to produce a steady tone.

Interrupt logic 23 is provided to interrupt the controller in the case of a phone ring or upon the receipt or completed transmission of a DTMF digit.

An interface to the ISA data bus is provided for data transfer and control between the controller and the phone line interface board.

A MSDOS Terminate and Stay Resident (TSR) driver for the phone line interface board provides the necessary hardware communication and control. This driver controls the phone line interface board and communicates to the main FQM system process through the use of a shared memory buffer that is created by the TSR. The shared memory buffer is defined in TABLE A. (TABLES A through D appear at the end of this specification).

Six I/O mapped hardware control registers are accessed by the phone line interface device driver. These registers are used to initialize and control all functionality of the phone line interface board. These I/O mapped hardware locations are listed and described in TABLE B.

The FQM system is completely remotely controlled by the MQM system This is accomplished with command sent via DTMF tones generated with the DSP audio measurement subsystem in the MQM system. The FQM receives instructions through the commands it receives through these DTMF tones. The FQM acknowledges all commands it receives with either a positive or negative acknowledgment messages also sent via DTMF tones. The messaging scheme used is fully described in TABLE C.

The audio quality measurements made by the FQM and MQM systems are identical in nature and are based on well known audio noise measurement techniques. For example see ANSI/IEEE Standard 743-1984, "Methods and Equipment for Measuring the Transmission Characteristics of Analog Voice Frequency Circuits" and ANSI/EIA/TIA 204-D-1989 "Minimum Standards for Land Mobile Communication FM or PM Receivers, 25–866 MHz".

The DSP based audio measurement subsystems utilized in the FQM and MQM systems incorporate well known techniques for the filtering and measurement of audio signals. These techniques are widely disclosed in a number publications.

The DSP based audio measurements subsystems utilized in both the MQM and FQM subsystems allow any audio quality measurement technique to be utilized. For this currently preferred embodiment the measurement techniques utilized are; enhanced SINAD, enhanced C message weighted SINAD, C message weighted audio level, and enhanced C weighted notched noise measurements.

The SINAD, C message weighted SINAD, and C-notched noise audio quality measurement techniques utilized incorporate a novel feature in the fact that two tones are incorporated instead of the single tone that is normally used. Two tones are used in order to measure the audio quality simultaneously in both the cellular radiotelephone uplink and downlink channels. An example of the technique is disclosed below for the SINAD measurement, the same technique would also apply to the other well known measurement types.

SINAD refers to the ratio of signal to noise and distortion and is a expressed in dB. SINAD is calculated using the following formula:

$$SINAD = 20\log \frac{signal + noise + distortion}{noise + distortion}$$

Figure 21:
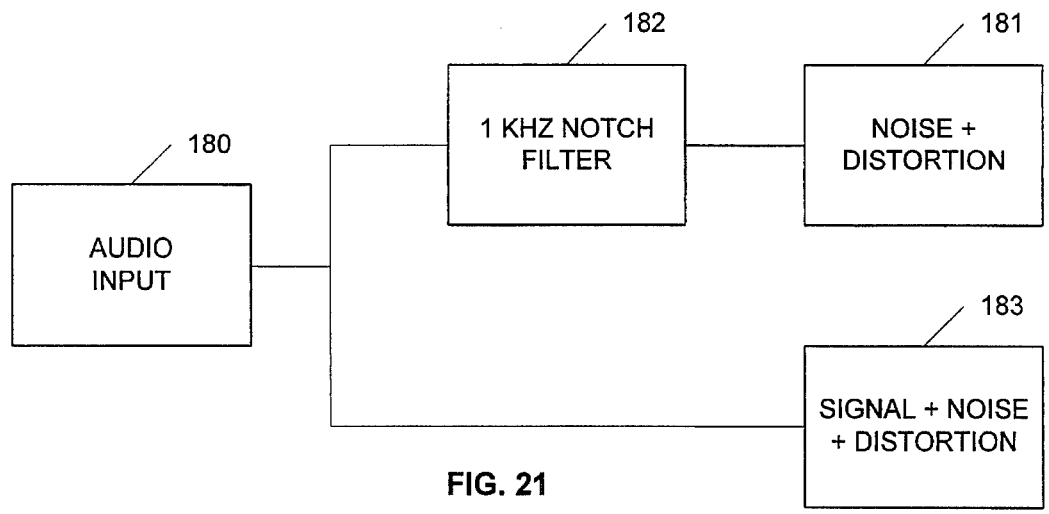
FIG. 21 shows a simplified block diagram of normal SINAD measurements.

FIG. 21 shows a block diagram of how normal SINAD measurements are made. The input audio 186 is an audio signal that has passed through the device under test, for example a cellular radiotelephone system. The audio must contain a 1 kHz tone. The audio is measured directly to find the value for signal+noise+distortion 183. The audio is also passed through a 1 Khz notch filter 182 that removes the signal and then measured to find the resultant noise+distortion 181. It is well known that a value of 12 dB is minimum acceptable SINAD for radio communication systems and a value of 20 dB or greater is considered good SINAD.

This method of measuring SINAD works well in a single ended system such as a standard FM broadcast radio receiver. A 1 kHz tone can be modulated onto an FM carrier and transmitted. The FM carrier can then be received and demodulated by the receiver under test and the resultant audio then measured as described above. The method also works well for simultaneous measurements of both channels of truly full duplex communications systems, but problems arise when simultaneous measuring the uplink and downlink channels in a cellular radiotelephone system. It is well known that the RF portion of the cellular radiotelephone communication infrastructure is truly full duplex, but the cellular system loses the true full duplicity when communication is transferred to the PSTN where both paths of the communication share a single path. An simple example of this can be realized when speaking into a land line telephone, anything spoken into the microphone can be heard in the speaker. The same problem exists in a cellular radiotelephone transceiver, anything spoken into the microphone can be heard in the speaker. When the normal method of measuring SINAD is attempted to simultaneously measure the both paths of a cellular radiotelephone call the two 1 Khz tones transmitted at each end of the call interact with each other.

This problem can be overcome in the cellular radiotelephone environment by using two tones for making SINAD measurements. One tone is transmitted from the fixed station and a different tone is transmitted from the mobile station. Each station uses a pre-notch filter that removes the locally transmitted tone from the received audio, the measurement of SINAD can then proceed as normal.

Figure 22:
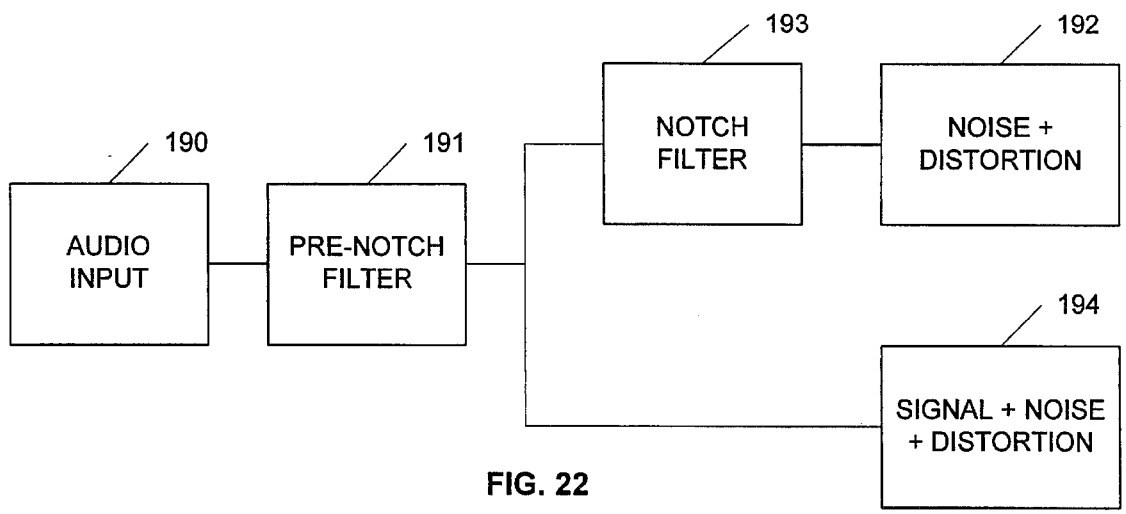
FIG. 22 shows a simplified block diagram of enhanced SINAD measurements.
Figure 23:
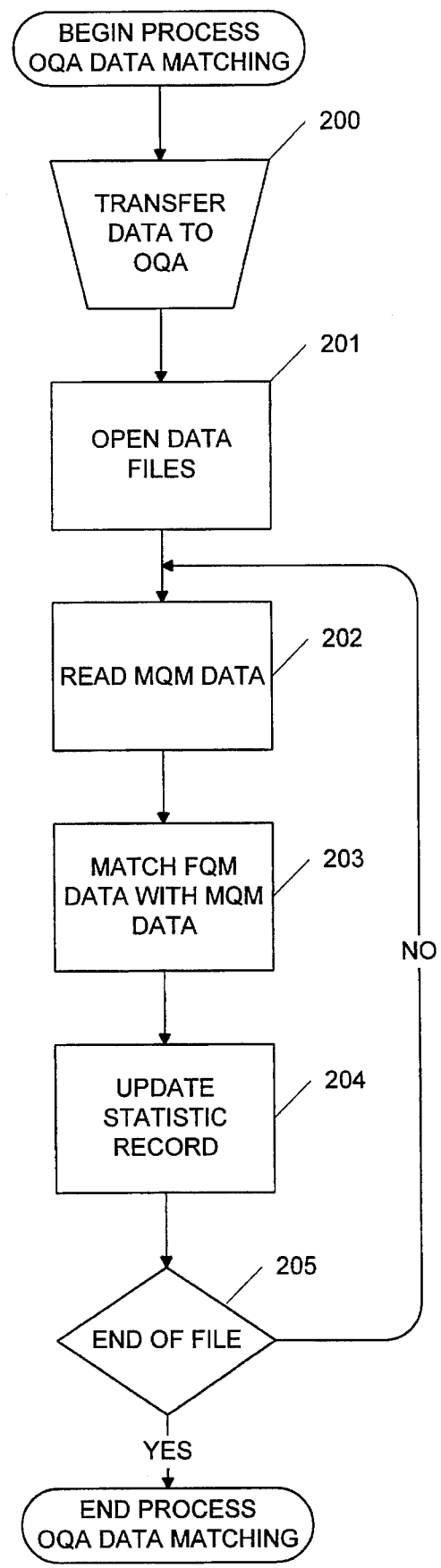
FIG. 23 shows a flow chart detailing the processing performed in the OQA system when matching MQM and FQM data.

FIG. 22 shows a block diagram of how the normal SINAD measurement scheme has been enhanced to allow simultaneous uplink and downlink measurements in a cellular radiotelephone environment utilizing cellular radiotelephone subscriber units as the mobile station. The input audio 190 is an audio signal that has passed through a cellular radiotelephone system. The audio contains a tone was transmitted from the opposite end of the cellular radiotelephone call and part if not all of the tone transmitted from the local station. The audio is then passed through a pre-notch filter 191 to remove the locally transmitted tone. The audio is then measured to find the value for signal+noise+distortion 194. The audio is also passed through a notch filter 193 that removes that tone transmitted from the remote station and then measured to find the resultant noise+distortion 194. The SINAD value is then calculated normally using the aforementioned calculation.

The DSP audio measurement subsystems in the MQM (FIG. 2 11) and the DSP audio measurement subsystem in the FQM (FIG. 3 13) operate identically. For clarity in describing the operation of the DSP audio measurement subsystem in the following paragraphs the MQM and FQM systems will be referred to as 'controller' and the DSP audio measurement subsystem will be referred to as 'DSP'.

There is a communication interface between the controller and the DSP. The interface consists of dual port ram accessible by the controller that is physically present on the DSP. Program loading for the DSP will be done through this dual port ram. All communications between the DSP and the controller will also be accomplished through this dual port ram. TABLE D lists the dual port ram layout.

After the initial DSP software load, the dual port ram on the DSP will be divided into command, configuration and data areas. The controller will initiate monitoring by initializing the configuration addresses for the selected channel. The DSP will perform the requested measurement type and fill the data area of the dual port ram with the results. The DSP runs continuously, measureing as long as a measurement type is configured in the dual port. Clearing the measurement enable flag disables measurement collection for a particular channel.

The configuration addresses are used to set up the sample size, select the measurement type, and set threshold values for noise monitoring. The sample size address is common to all channels. The measurement enables and threshold set and reset parameters are defined separately for each channel.

Each channel has a separate data area. The following data—Average, Maximum, Minimum, Standard Deviation, 10th, 50th, and 90th percentiles is written into the data area by the DSP when a period of time equal to the sample size has expired. This is the current measurement data.

Additionally, each channel has associated noise buffers in the data area. These buffers are used to store the current data when the noise threshold values have been exceeded. There are 10 buffers for each channel. Each time the threshold has been reset and then exceeded again, the current data is put into the next noise buffer. The noise buffer is circular, such that after the last location is filled, the next buffer to be used is the first buffer. This is the noise excursion measurement data.

Figure 5:
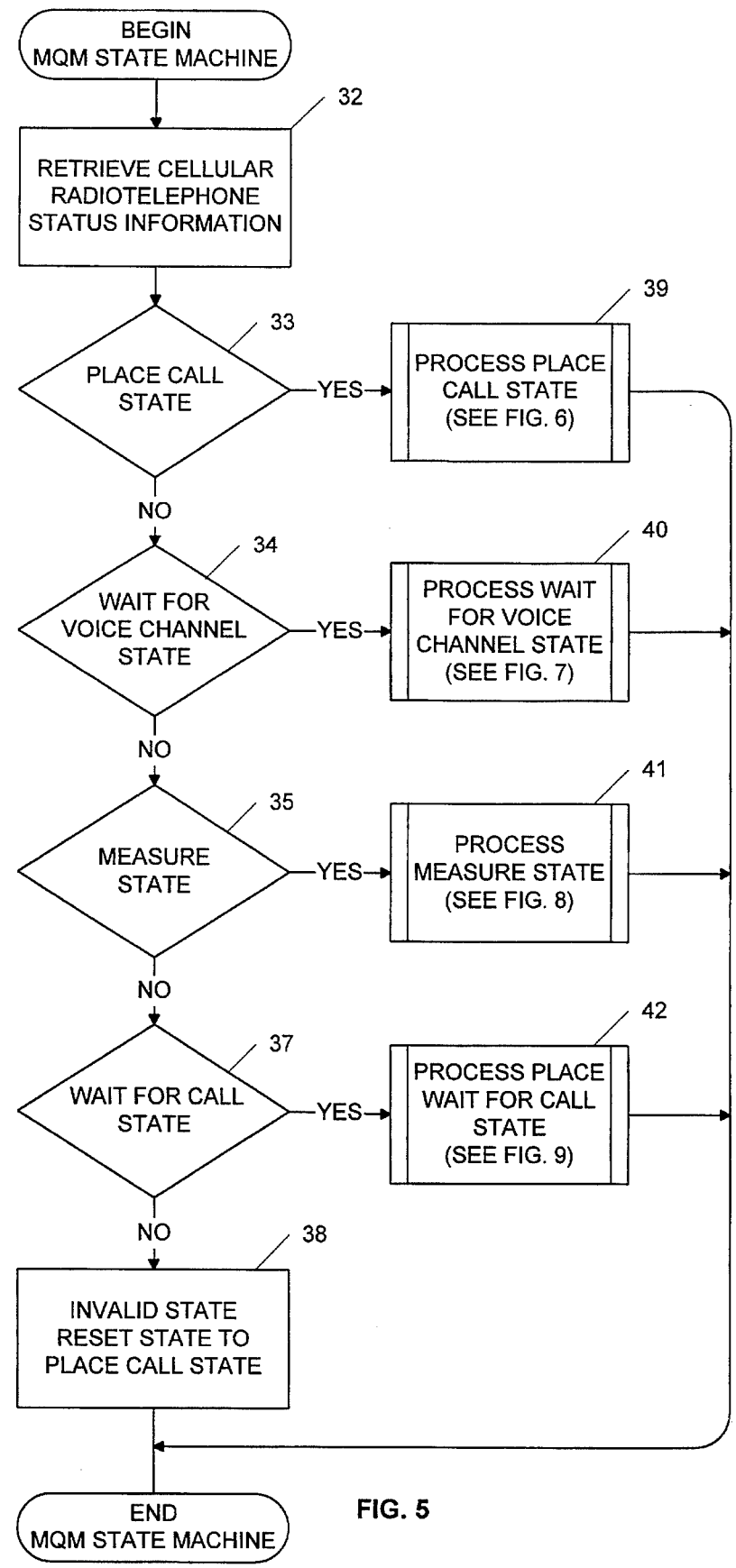
FIG. 5 shows a flow chart detailing the collection state machine used in the MQM system.

The cellular radiotelephone quality assessment data collection software used in MQM is based on a state machine. Different actions are taken based on the state of each cellular radiotelephone in the system. FIG. 5 is a flowchart detailing the processing of the state machine for the MQM system. This process is executed once each second for each cellular radiotelephone attached to the system. The cellular radiotelephone can be in one of four states—place call, wait for voice channel, measure, or wait for call. The initial state of each cellular radiotelephone is set to the place call state. Before the state of the cellular radiotelephone is tested in steps 33,34,35 and 37 the current status of the cellular radiotelephone is retrieved from the prior art cellular radiotelephone controller (FIG. 2. 10) by step 32. The status information includes all of the well known status information pertaining to the operation of a cellular radiotelephone including—service indication, ROAM indication, channel type voice/control, SAT fade, adjacent channel signal strength, and number of handoffs. This status information is referred to in conditional steps in the state processes. If the cellular radiotelephone is in the place call state 33 then further processing is taken in the place call state process step 39. If the cellular radiotelephone is in the wait for voice channel state 34 then further processing is taken in the wait for voice channel state process step 40. If the cellular radiotelephone is in the measure state 35 then further processing is taken in the measure state process step 41. If the cellular radiotelephone is in the wait for call state 37 then further processing is taken in the wait for call state process step 42. If an invalid state is detected by reaching step 38 the state is reset to the place call state.

Figure 6:
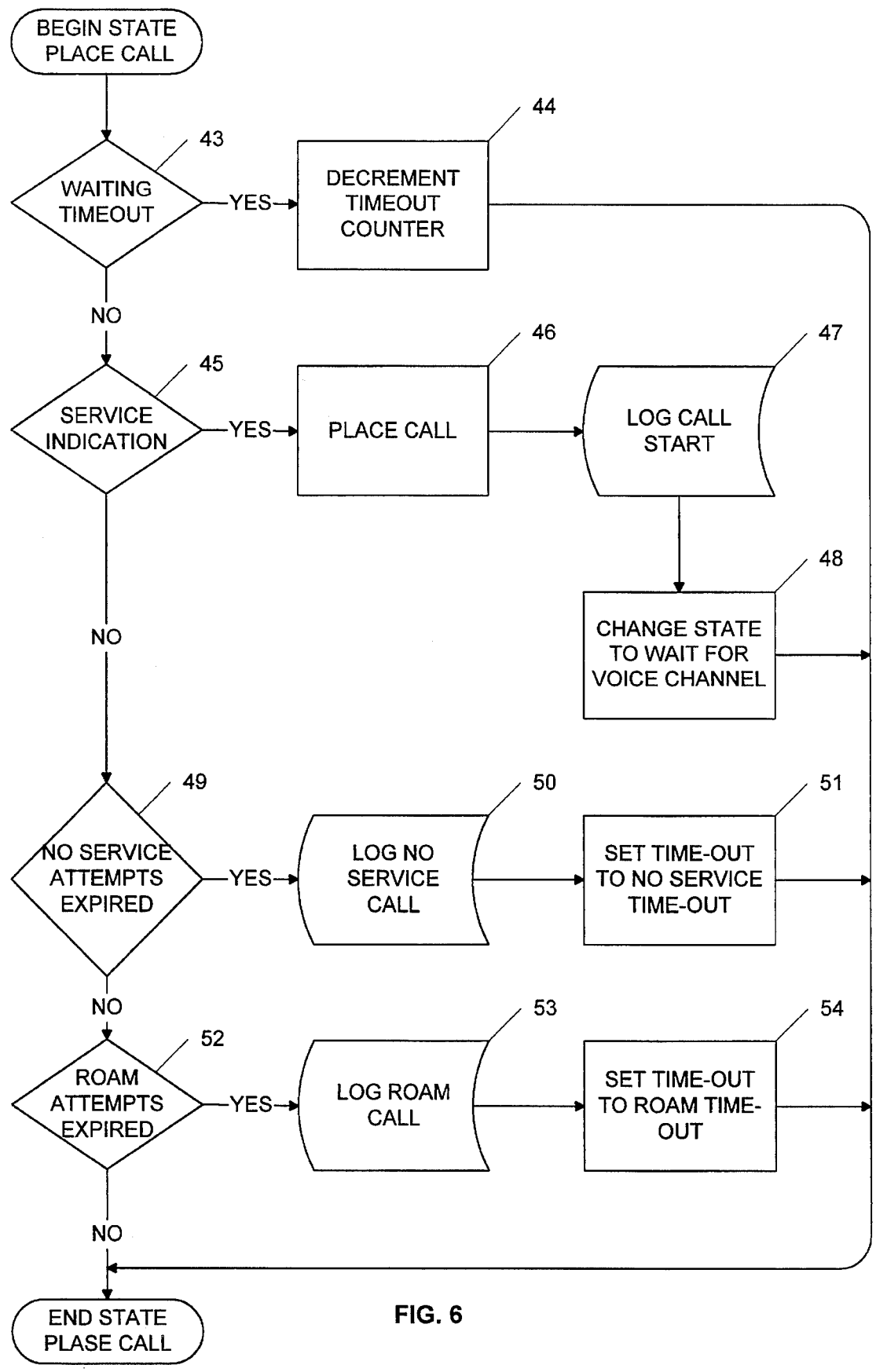
FIG. 6 shows a flow chart detailing the place call state used in the MQM system.

FIG. 6 is a flowchart detailing the processing taken by the MQM system when the cellular radiotelephone is in the place call state. A time-out counter is used to allow for call retries when a call is attempted with either no service or ROAM indication. This time-out is first tested in step 43 before any further processing is taken. If the time-out is not zero then the time-out counter is decremented in step 44 and the process is exited. If the time-out is zero the cellular radiotelephone is tested for service indication in step 45. If a service indication is observed then a call is placed in step 46, the start of a call is recorded in step 47 and the state of the cellular radiotelephone is changed to the wait for voice channel state in step 48.

No Service Call Attempt Determination

If no service indication is observed for five consecutive seconds then a call with no service is recorded in step 50 and the time-out counter is setup to the no service time-out period in step 51.

ROAM Call Attempt Determination

If the cellular radiotelephone has ROAM indication for 5 consecutive seconds 52 then a ROAM call is recorded 53 and the time-out counter is setup to the ROAM call time-out period 54.

Figure 7:
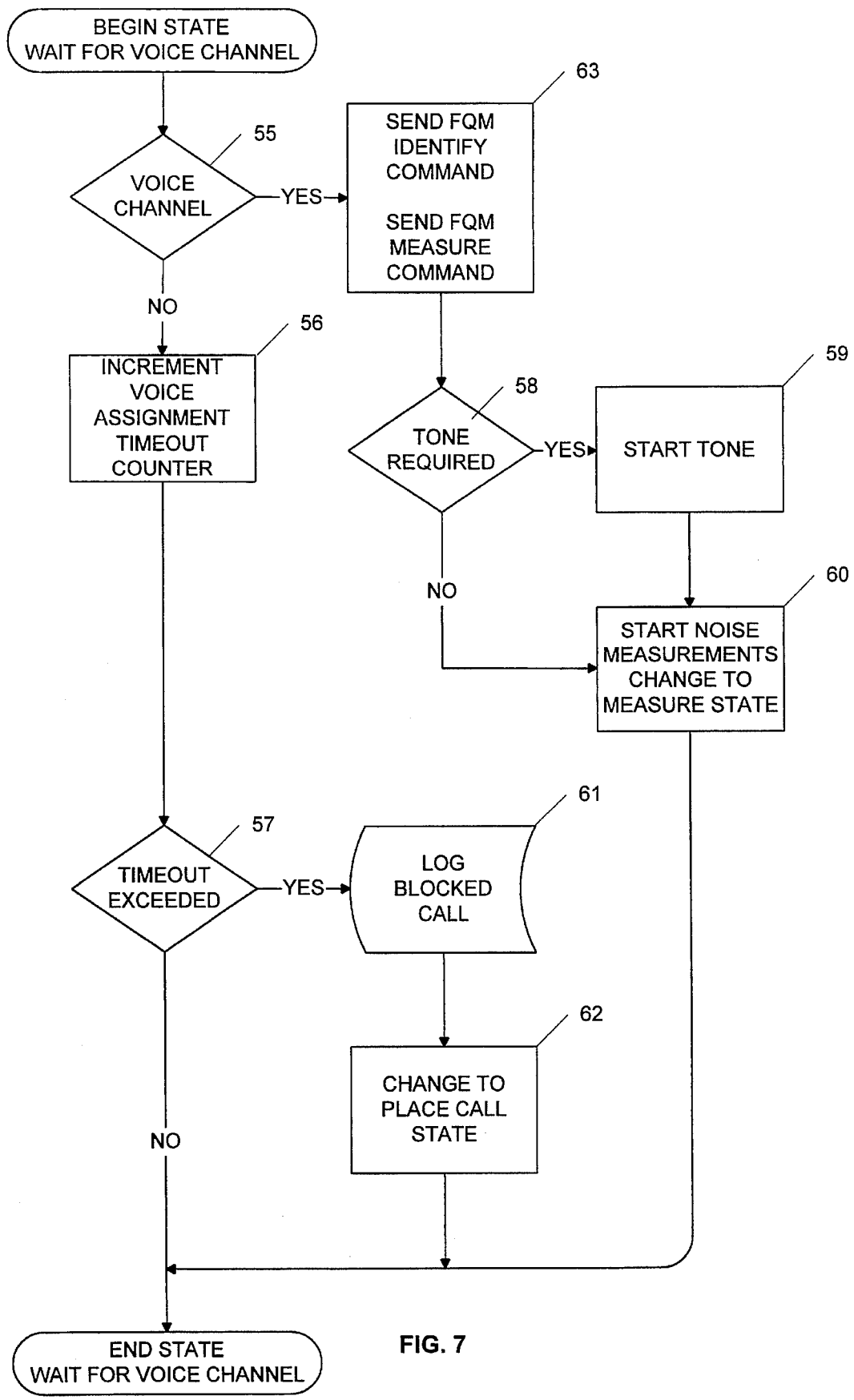
FIG. 7 shows a flow chart detailing the wait for voice channel call state used in the MQM system.

FIG. 7 is a flowchart detailing the processing taken by the MQM system when the cellular radiotelephone is in the place call state. In step 55 the cellular radiotelephone is first tested for a voice channel assignment.

Blocked Call Determination

If the cellular radiotelephone is not on a voice channel then in step 56 the voice channel assignment counter is incremented. This counter keeps track of the number of seconds since a call was placed and a voice channel was assigned. This value is tested by step 57 if a time-out value is exceeded then in step 61 a blocked call is recorded and step 62 changes the state of the cellular radiotelephone to the place call state. The value of the time-out is variable from one cellular system to another and is adjustable by the operator of the system. A typical value for the time-out is ten seconds.

If the cellular radiotelephone is on a voice channel then step 63 sends the identify and the measure commands to the FQM system. The identify command sent from the MQM system to the FQM system informs the FQM system which MQM system and which attached radiotelephone for that MQM system is responsible for the call. The identify command also contains the current date and time of the MQM system. The FQM utilizes the identity and data and time information to mark all of the collected data so that that the OQA system may later match the collected data. The measure command also transmitted in step 63 contains all of the information needed by the FQM system to begin audio measurements. Step 58 then decides if a tone is required by the currently selected measurement type. If a tone is required step 59 starts the tone. Step 63 then starts audio measurements and changes the state of the radiotelephone to the measure state.

Figure 8:
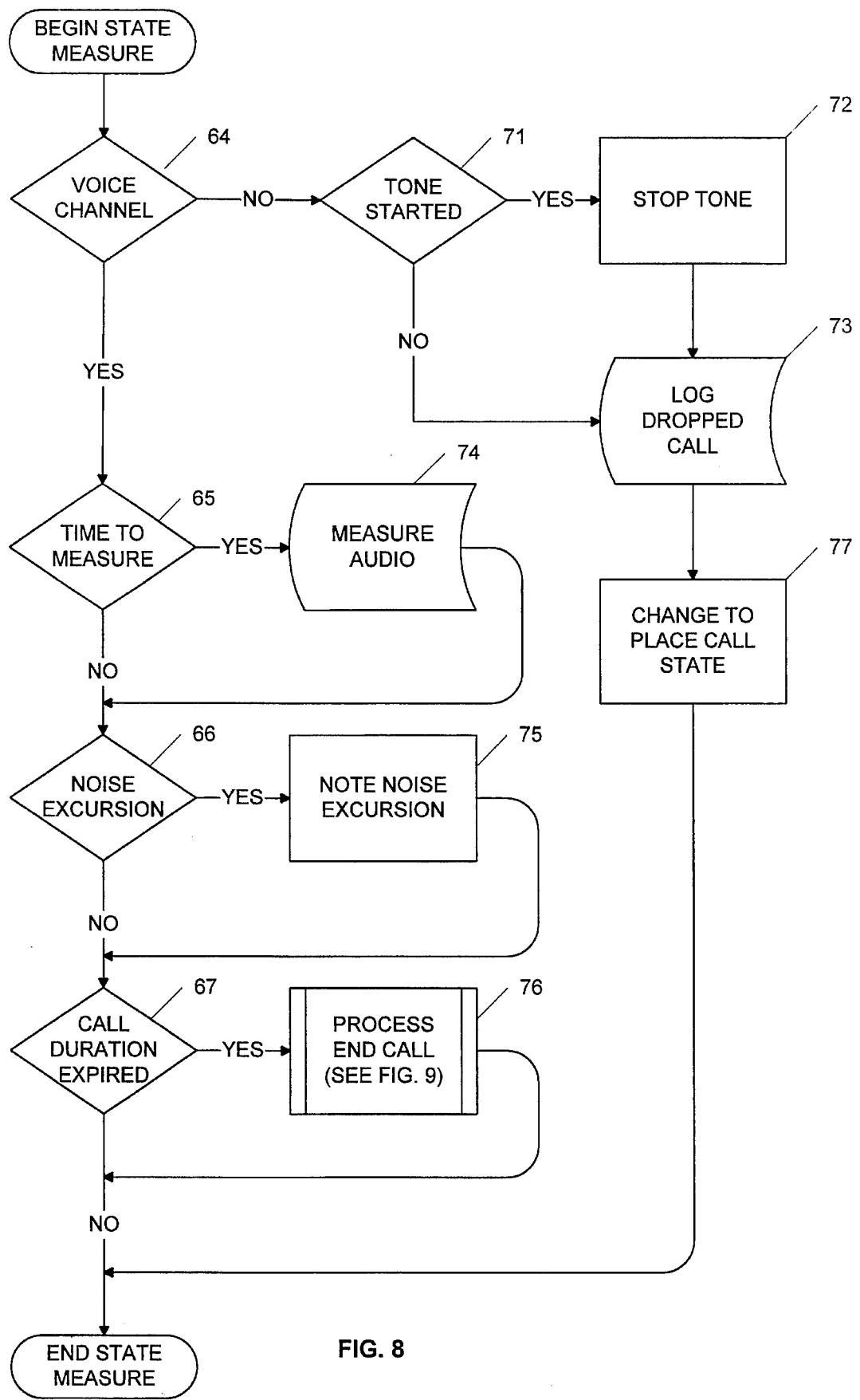
FIG. 8 shows a flow chart detailing the measure state used in the MQM system.

FIG. 8 is a flowchart detailing the processing taken by the MQM system when the cellular radiotelephone is in the measure state. The cellular radiotelephone is first tested by step 64 to see if it is still on a voice channel.

Dropped Call Determination

If the cellular radiotelephone is no longer on a voice channel then step 71 determines if a tone has been started. If a tone has been started step 72 stops the tone. Step 73 then records a dropped call. The state of the radiotelephone is then changed to the place call state in step 77.

If the cellular radiotelephone is still on a voice channel then step 65 determines if it is time to measure the audio. If it is time to measure the audio than the current audio measurement is recorded in step 74. Step 66 determines if an audio measurement excursion has been observed if so this is noted by step 75 for future reference in the end call process (see FIG. 9). If the call duration has expired 67 then step 76 executes the end call process (see FIG. 9).

Figure 9:
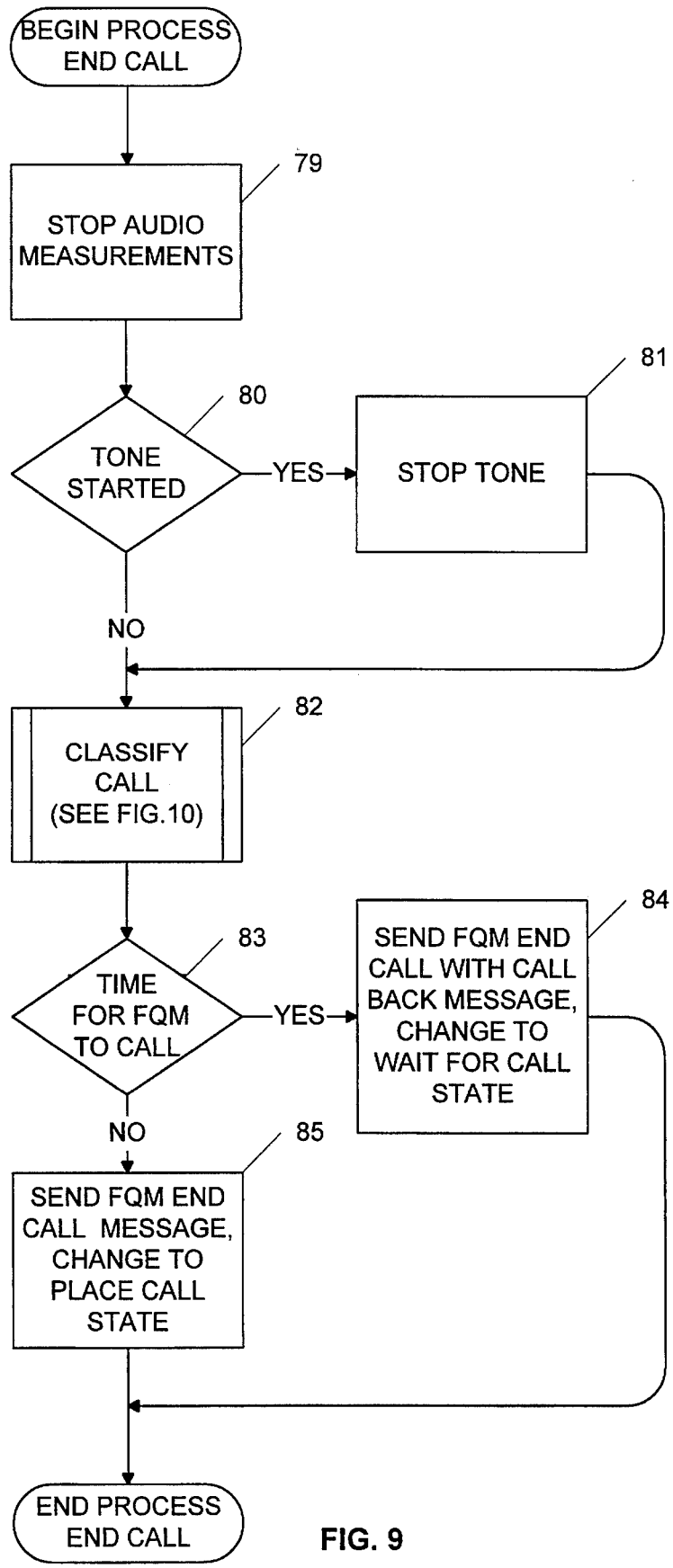
FIG. 9 shows a flow chart detailing the end call process used in the MQM system.

FIG. 9 is a flowchart detailing the processing taken by the MQM system during the end call process. Audio measurements are first stopped by step 79. Step 80 determines if a tone has been started. If a tone has been started step 81 stops the tone. The classify call process (see FIG. 10) is then executed by step 83. Step 83 determines if it is time for the FQM system to call the MQM system. If is time for the FQM to call the MQM then step 84 sends the End Call with call back message to the FQM system and the state is changes the state of the cellular radio telephone to the wait for call state. Otherwise step 95 sends the end call message is to the FQM system and the state of the cellular radiotelephone is changed to the place call state. The determination of whether is it time for the FQM to call the MQM is user configurable and is made by counting the number of contiguous MQM calls. The number of MQM calls between each FQM call is user definable and may be disabled, in which case all calls are made by the MQM system.

Figure 10:
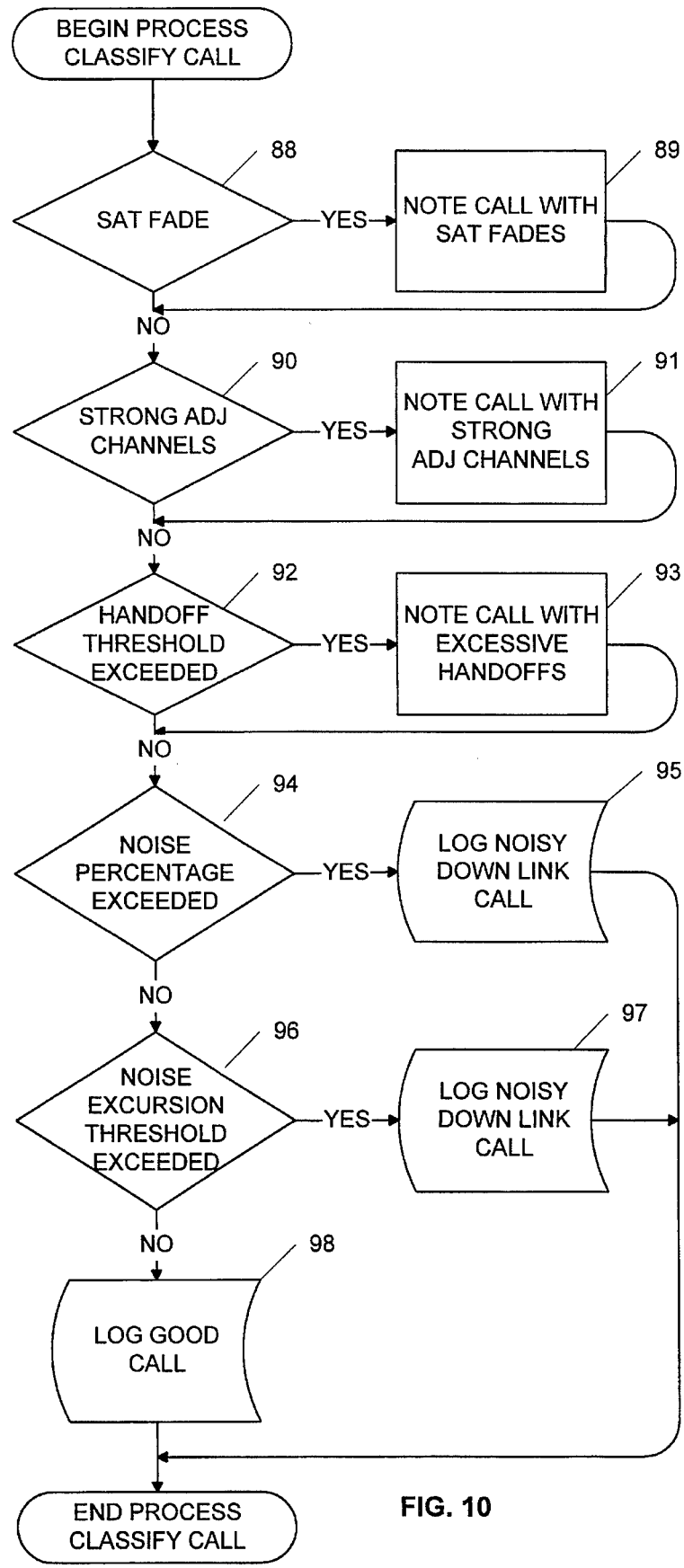
FIG. 10 shows a flow chart detailing the classify call process used in the MQM system.

FIG. 10 is a flowchart detailing the processing taken by the MQM system during the classify call process.

Sat Fade Determination

Step 88 determines if a SAT fade was observed during the call. If the call had SAT fades step 89 marks the call as call with SAT fades. The determination of an observed SAT fade during a call is made by the prior art cellular radiotelephone controller 10 of FIG. 2.

Strong Adjacent Channel Determination

Step 90 determines if a strong adjacent channel was observed during the call. If a strong adjacent channel was observed then the call is marked by step 91 as a call with strong adjacent channels. The determination of an observed strong adjacent channel during a call is made by the prior art cellular radiotelephone controller 10 of FIG. 2.

Excessive Handoff Determination

Step 92 determines if the number of handoffs observed during the call exceed the handoff threshold. If the number of handoffs exceed the handoff threshold then the call is marked as a call with excessive handoffs. The handoff threshold is user definable. A typical value for a thirty second call is four. The determination of excessive handoffs is made by counting the number of handoffs observed during the call by the prior art cellular radiotelephone controller 10 of FIG. 2.

Noisy Down Link Call Determination

If the percentage of the audio measurements made during the call that fall outside the audio measurement threshold exceed the noise measurement percentage threshold 94 then the call is classified as a noisy downlink call 95. If the number of noise excursions observed during the call exceed the noise excursion threshold 96 then the call is classified as a noisy down link call 97.

Good Call Determination

Otherwise the call is Classified in step 98 as a good call.

Figure 11:
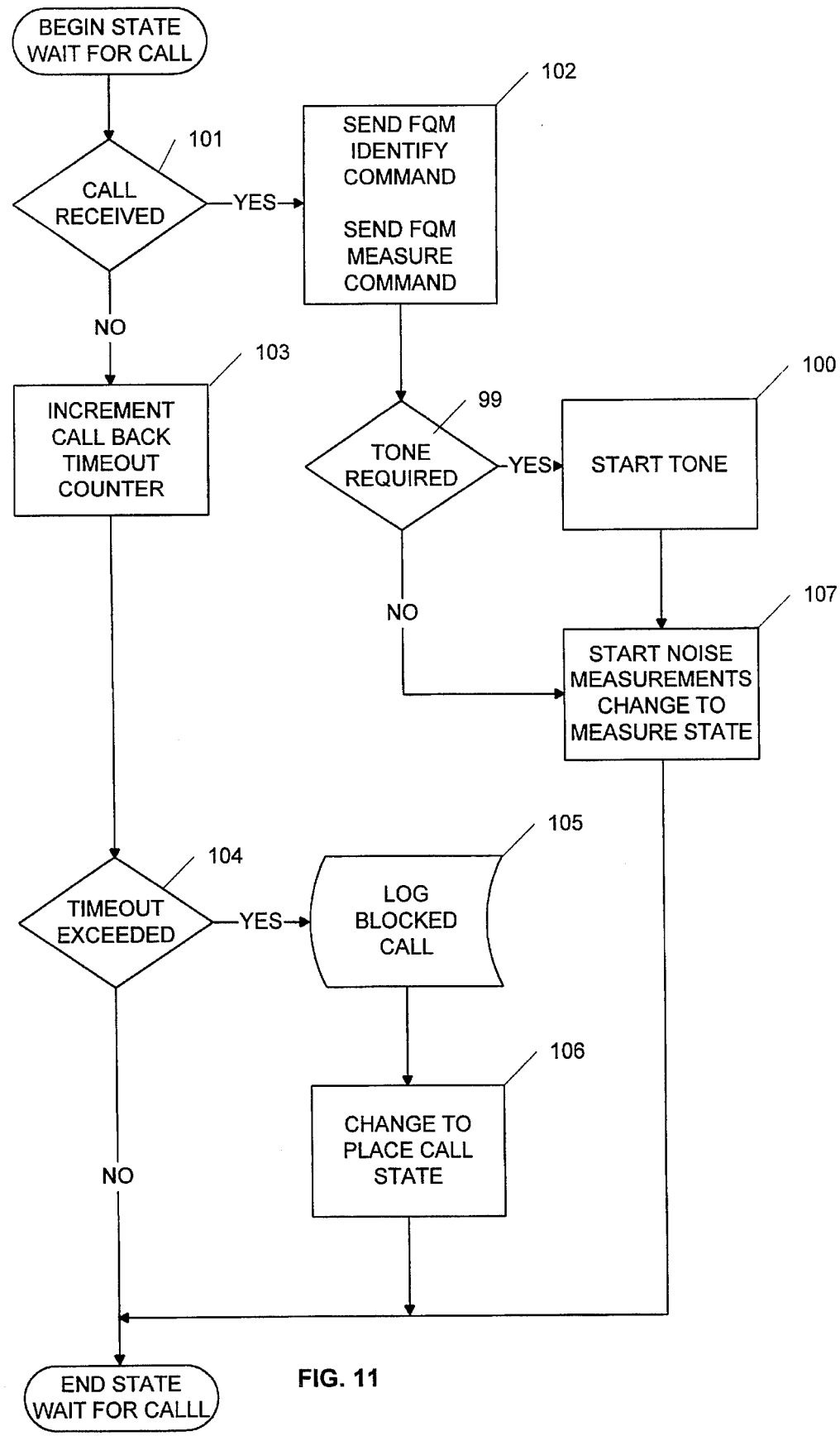
FIG. 11 shows a flow chart detailing the wait for call state used in the MQM system.

FIG. 11 is a flowchart detailing the processing taken by the MQM system when the cellular radiotelephone is in the wait for call state. Step 101 determines if a call has been received.

Blocked Call Determination

If the cellular radiotelephone has not received a call as determined by step 101 then in step 103 the call back time-out counter is incremented. This counter keeps track of the number of seconds since the end call with call back command was issued to the FQM. This value is tested by step 104. If the time-out value is exceeded then step 105 records a blocked call and step 106 changes the state or the cellular radiotelephone to the place call state. The value of the time-out is variable from one cellular system to another and is adjustable by the operator of the system. A typical value for the time-out is twenty seconds.

If the cellular radiotelephone has received a call then step 102 sends the identify and the measure commands to the FQM system. Step 99 then decides if a tone is required by the currently selected measurement type. If a tone is required step 100 starts the tone. Step 107 then starts audio measurements and changes the state of the radiotelephone to the measure state.

Figure 12:
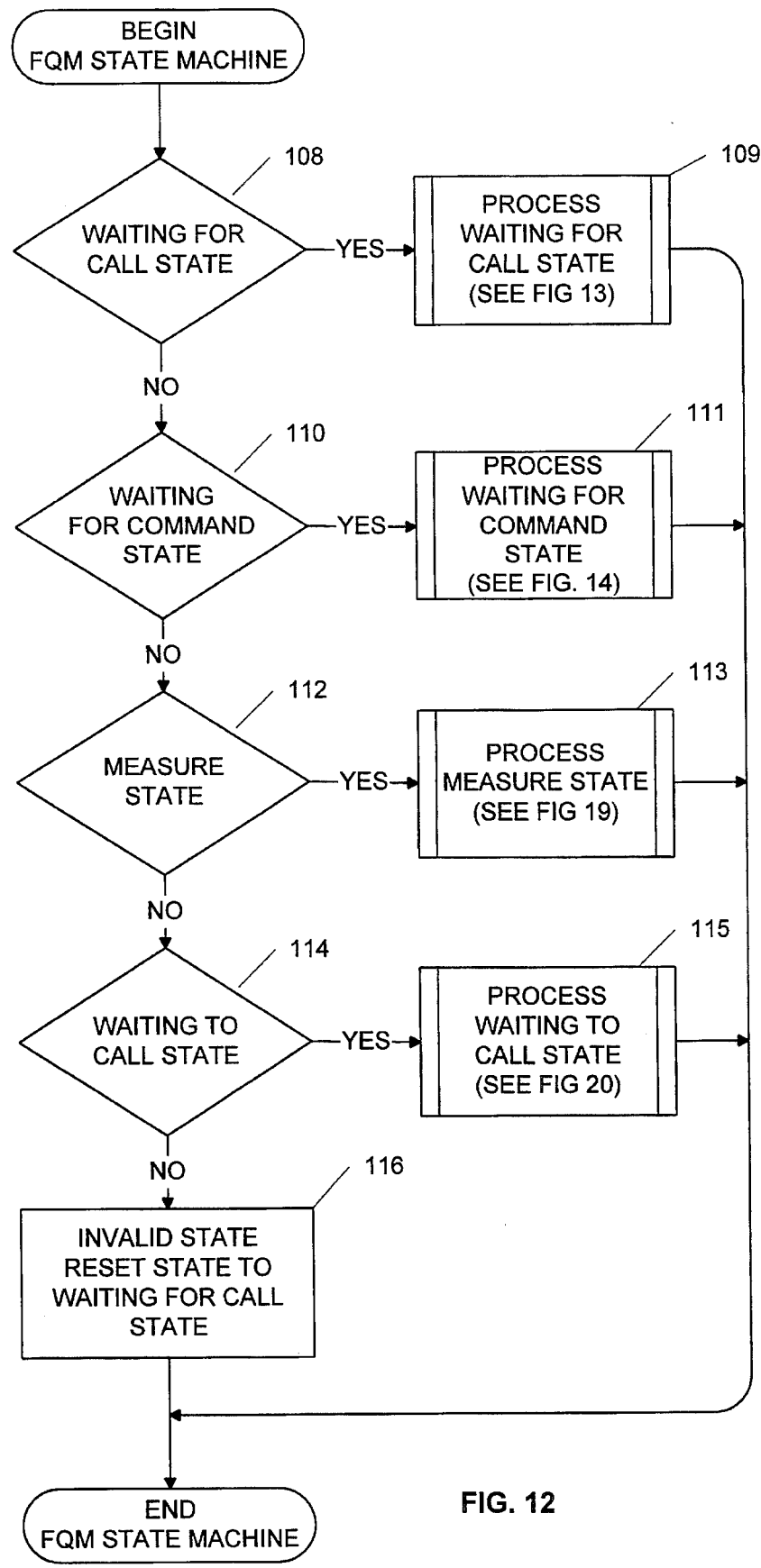
FIG. 12 shows a flow chart detailing the collection state machine used in the FQM system.

The cellular radiotelephone quality assessment data collection software used in FQM is also based on a state machine. Different actions are taken based on the state of each phone line attached to the system. FIG. 12 is a flowchart detailing the processing of the state machine for the FQM system. This process is executed once each second for each phone line attached to the system. Each phone line can be in one of four states—waiting for call, waiting for command, measure, and waiting to call. The initial state of each phone line is set to waiting for call state. If the phone line is in the waiting for call state as determined by step 108 then further processing is taken in the place call state process step 109. If the phone line is in the waiting for command channel state as determined by step 110 then further processing is taken in the waiting for command state process step 111. If the phone line is in the measure state as determined by step 112 then further processing is taken in the measure state process step 113. If the phone line is in the waiting to call state as determined by step 114 then further processing is taken in the waiting for call state process step 115. If an invalid state is detected by reaching step 116 the state of the phone line is reset to the place call state.

Figure 13:
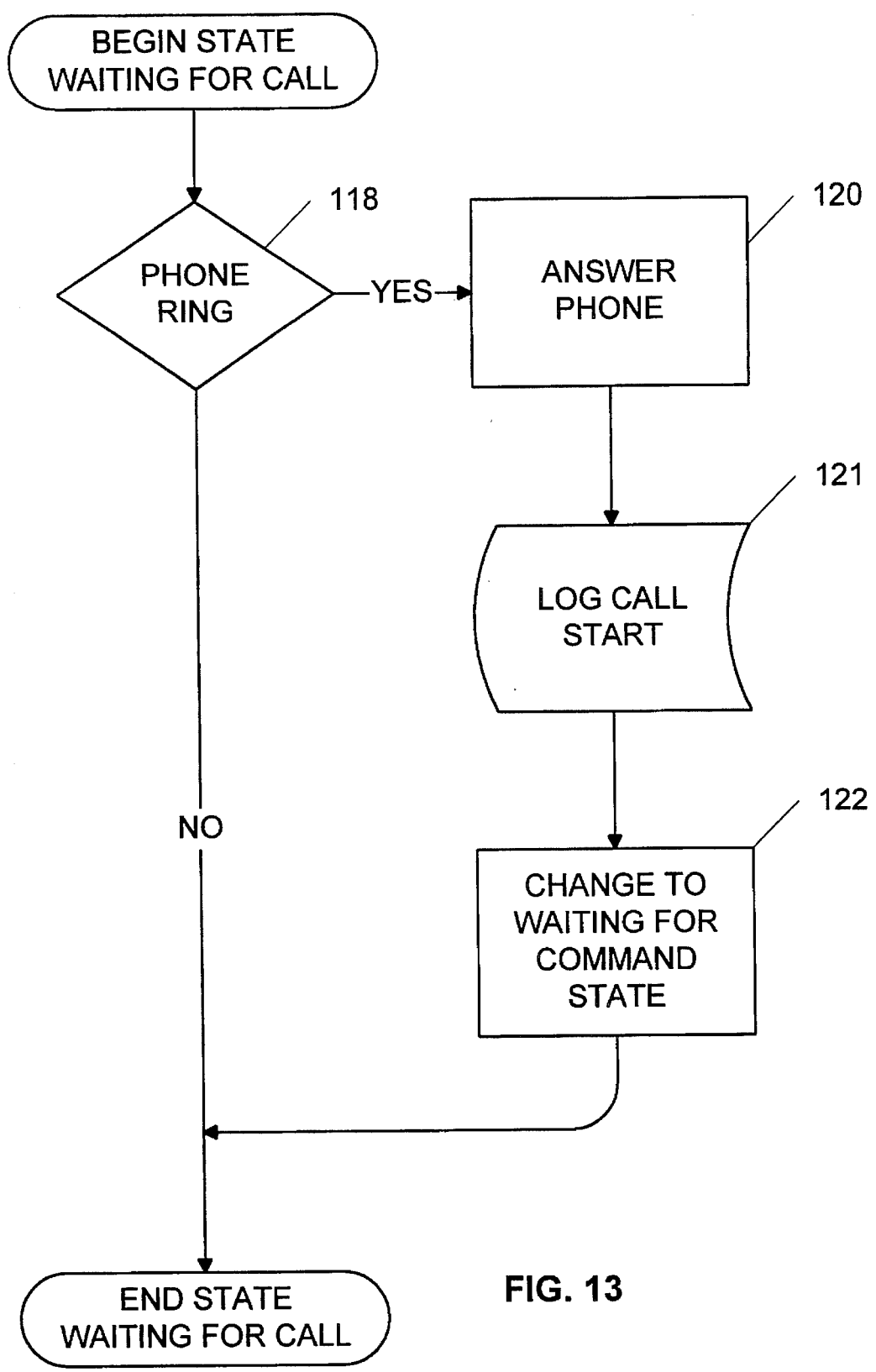
FIG. 13 shows a flow chart detailing the wait for call state used in the FQM system.

FIG. 13 is a flowchart detailing the processing taken by the FQM system when the phone line is in the wait for call state. If a phone ring is detected by step 119 then step 120 answers the phone, step 121 records a call start and step 122 changes the state of the phone line to the waiting for command state. Otherwise no action is taken.

Figure 14:
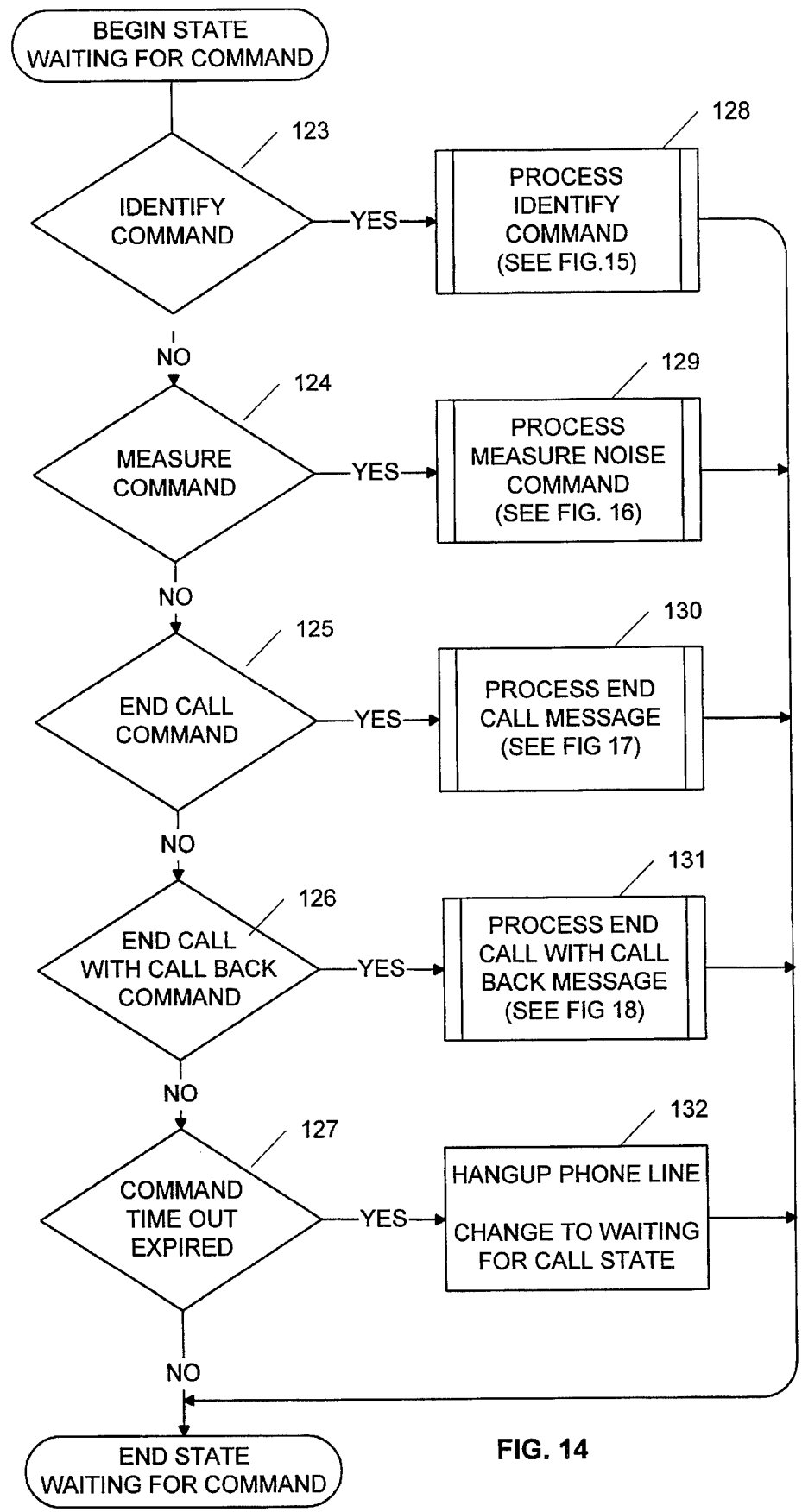
FIG. 14 shows a flow chart detailing the wait for command state used in the FQM system.

FIG. 14 is a flowchart detailing the processing taken by the FQM system when the phone line is in the waiting for command state. If the identify command is received as determined by step 123 then further processing is made in the identify command process step 128. If the measure command is received as determined by step 124 then further processing is made in the measure command process step 129. If the end call command is received as determined by step 125 then further processing in made in the identify command process step 130. If the end call with call back command is received as determined by step 126 then further processing in made in the end call with callback command process 131. If a command is not received in a operator defined time-out period 127 then the phone line is hung up and the state is changed to the waiting for call state 132.

Figure 15:
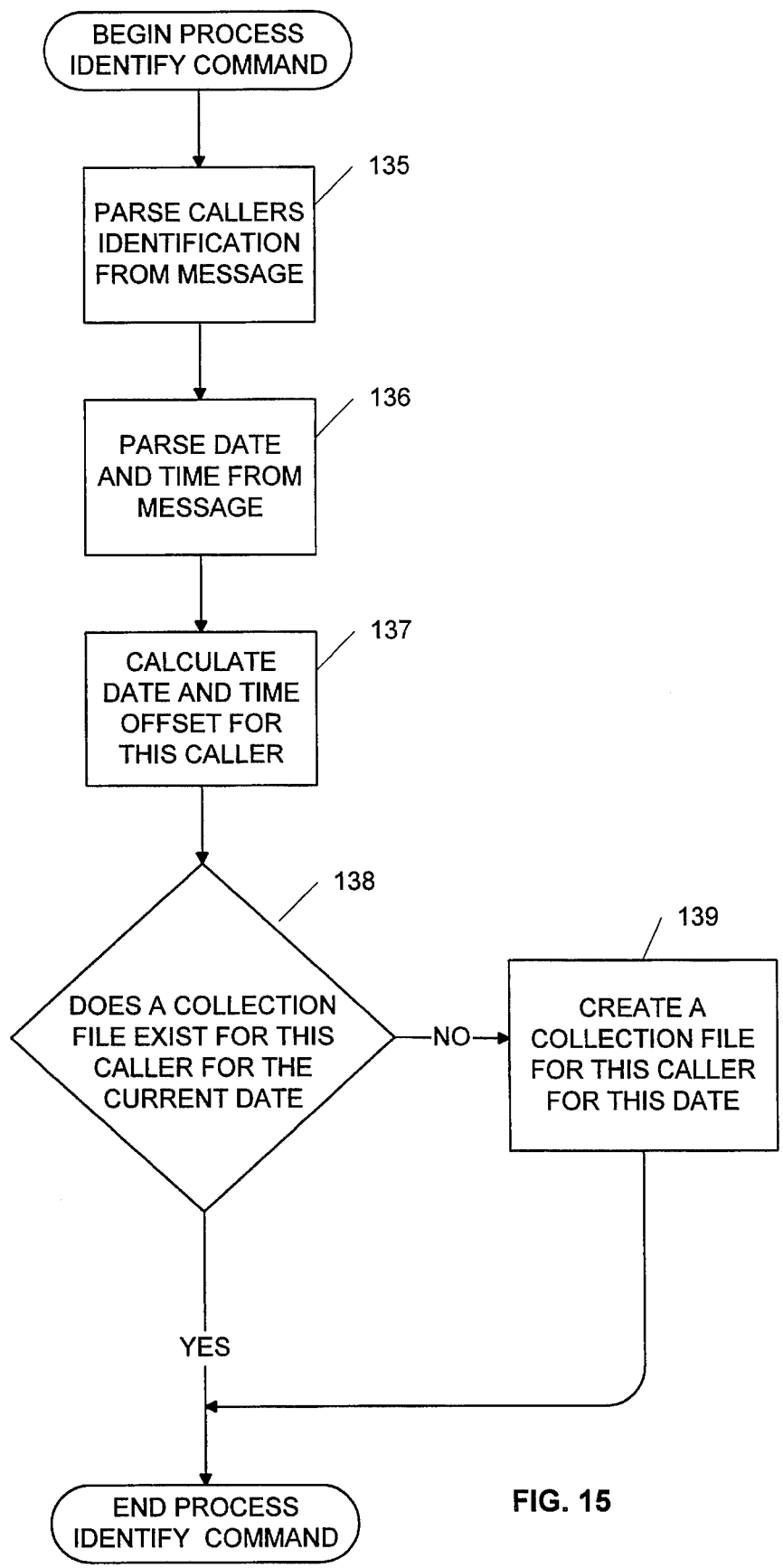
FIG. 15 shows a flow chart detailing the identify command process used in the FQM system.

FIG. 15 is a flowchart detailing the processing performed by the FQM system during the identify command process. First the identity of the calling system is extracted from the message by step 135. The date and time of the calling system is then extracted from the message by step 136. In step 137 the time offset between the calling MQM and the FQM is calculated. This time offset is used for all data written for the calling system. This allows multiple MQM systems to call one FQM system as all time references in the data collection files in both the MQM and FQM systems represent the date and time in the MQM system. The FQM data collection file names are constructed from the calling device's identification and the date of the call. If a data collection file does not exist for the calling device as determined by step 138 then a file is created in step 139.

Figure 16:
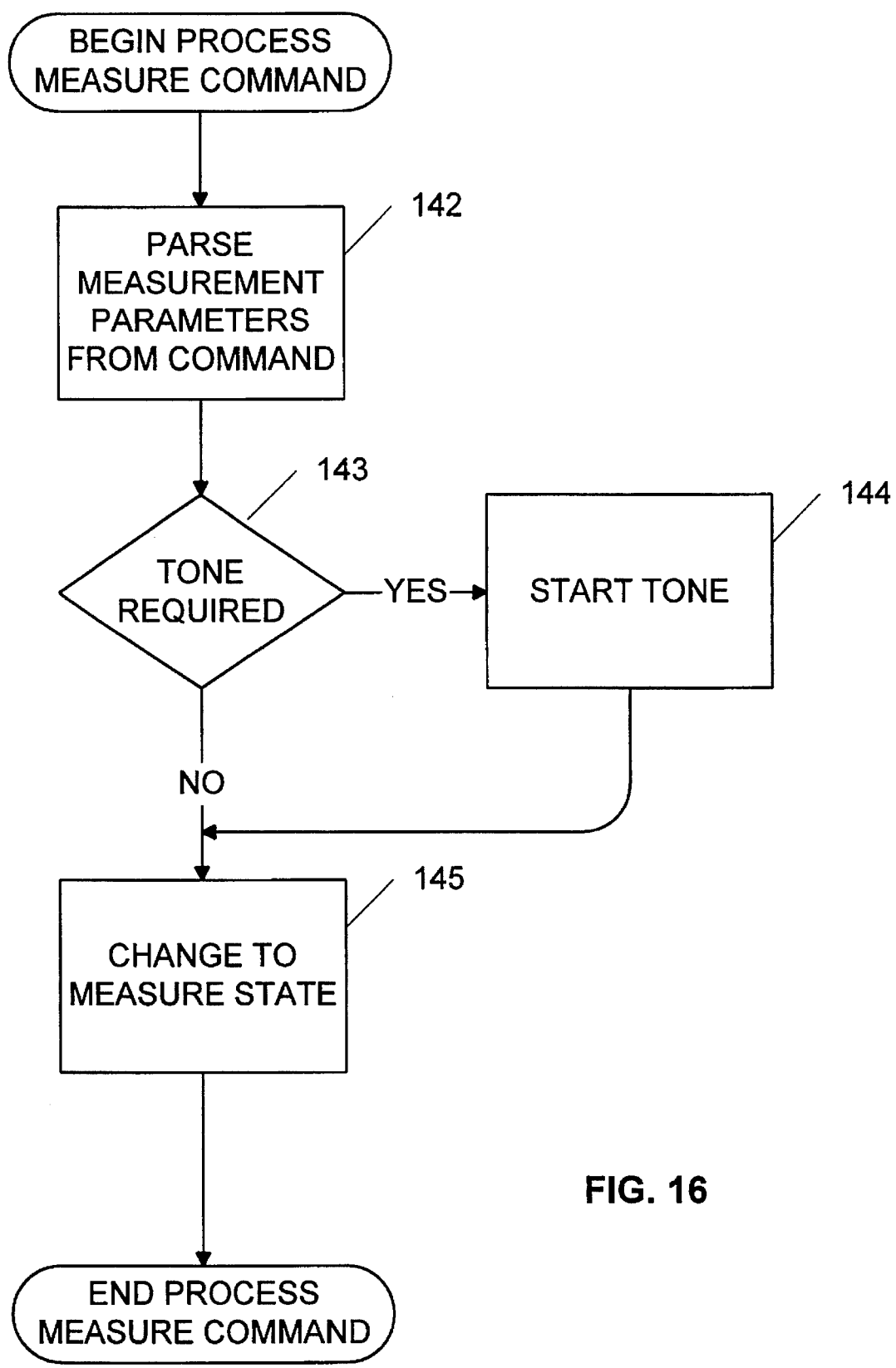
FIG. 16 shows a flow chart detailing the measure command process used in the FQM system.

FIG. 16 is a flowchart detailing the processing performed by the FQM system during the measure command process. First the measurement parameters are extracted from the command by step 142. If the requested measurement type requires a tone as determined by step 143 then a tone is started in step 144. Step 145 then changes the state of the phone line to the measure state.

Figure 17:
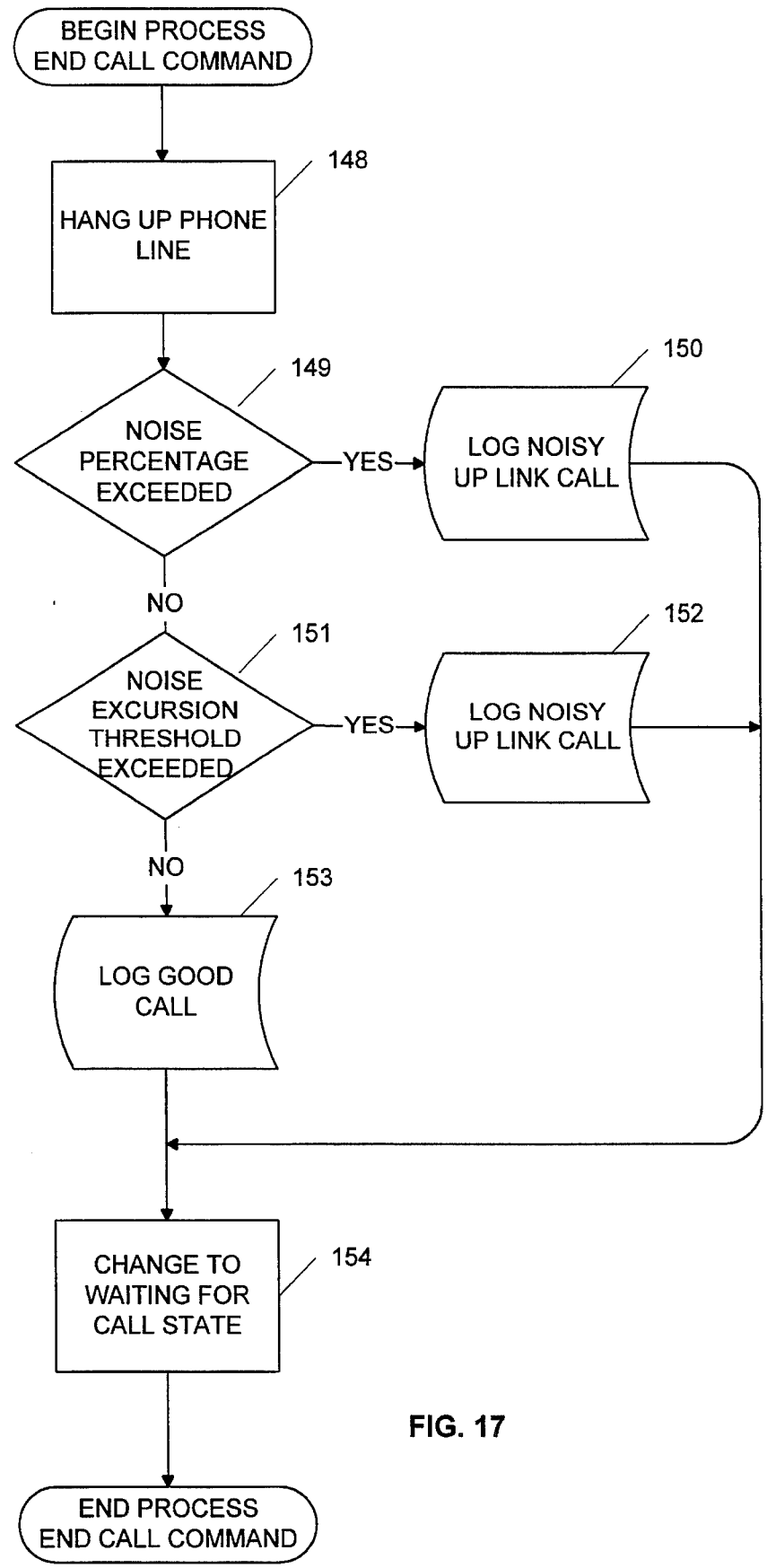
FIG. 17 shows a flow chart detailing the end call command process used in the FQM system.

FIG. 17 is a flowchart detailing the processing performed by the FQM system during the end call command process. First, in step 148, the phone line in hung up.

Noisy Up Link Call Determination

If the percentage of the audio measurements made during the call that fall outside the audio measurement threshold exceed the noise measurement percentage threshold as determined by step 149 then in step 150 the call is classified as a noisy up link call. Step 151 determines if the number of noise excursions observed during the call exceed the noise excursion threshold, if so, the call is classified as a noisy up link call in step 152.

Good Up Link Call Determination

Otherwise the, call is classified as a good call by step 153.

The state of the phone line is then changed to the waiting for call state by step 154.

Figure 18:
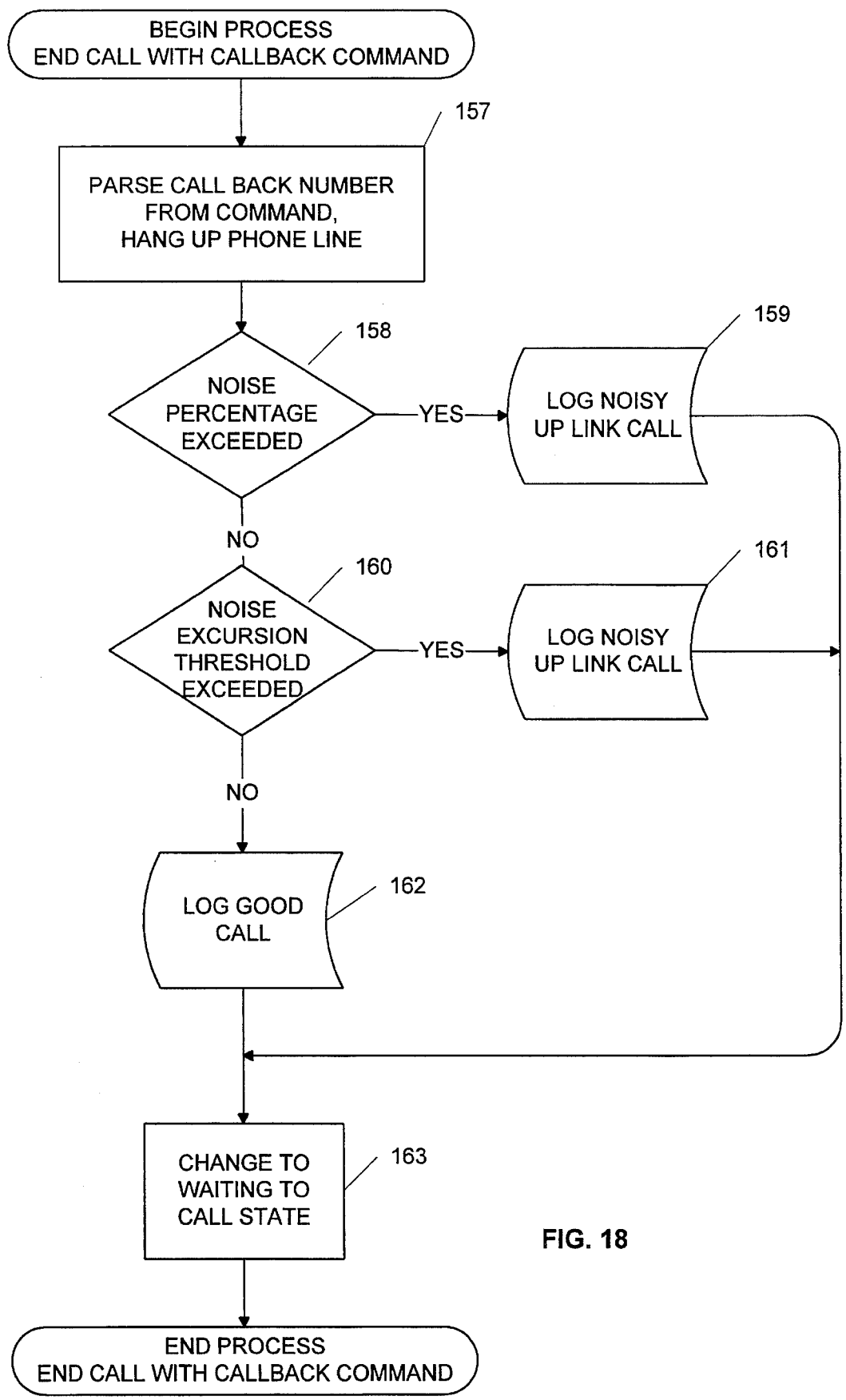
FIG. 18 shows a flow chart detailing the end call with call back command process used in the FQM system.

FIG. 18 is a flowchart detailing the processing performed by the FQM system during the end call with call back command process. First in step 157 the phone number to call back is extracted from the command and the phone line is hung up.

Noisy Up Link Call Determination

If the percentage of the audio measurements made during the call that fall outside the audio measurement threshold exceed the noise measurement percentage threshold as determined by step 158 then the call is classified as a noisy up link call in step 159. Step 160 determines if the number of noise excursions observed during the call exceed the noise excursion threshold if so the call is classified as a noisy up link call 161.

Good Up Link Call Determination

Otherwise the call is classified as a good up link call by step 162.

The state of the phone line is then changed to the waiting to call state by step 163.

Figure 19:
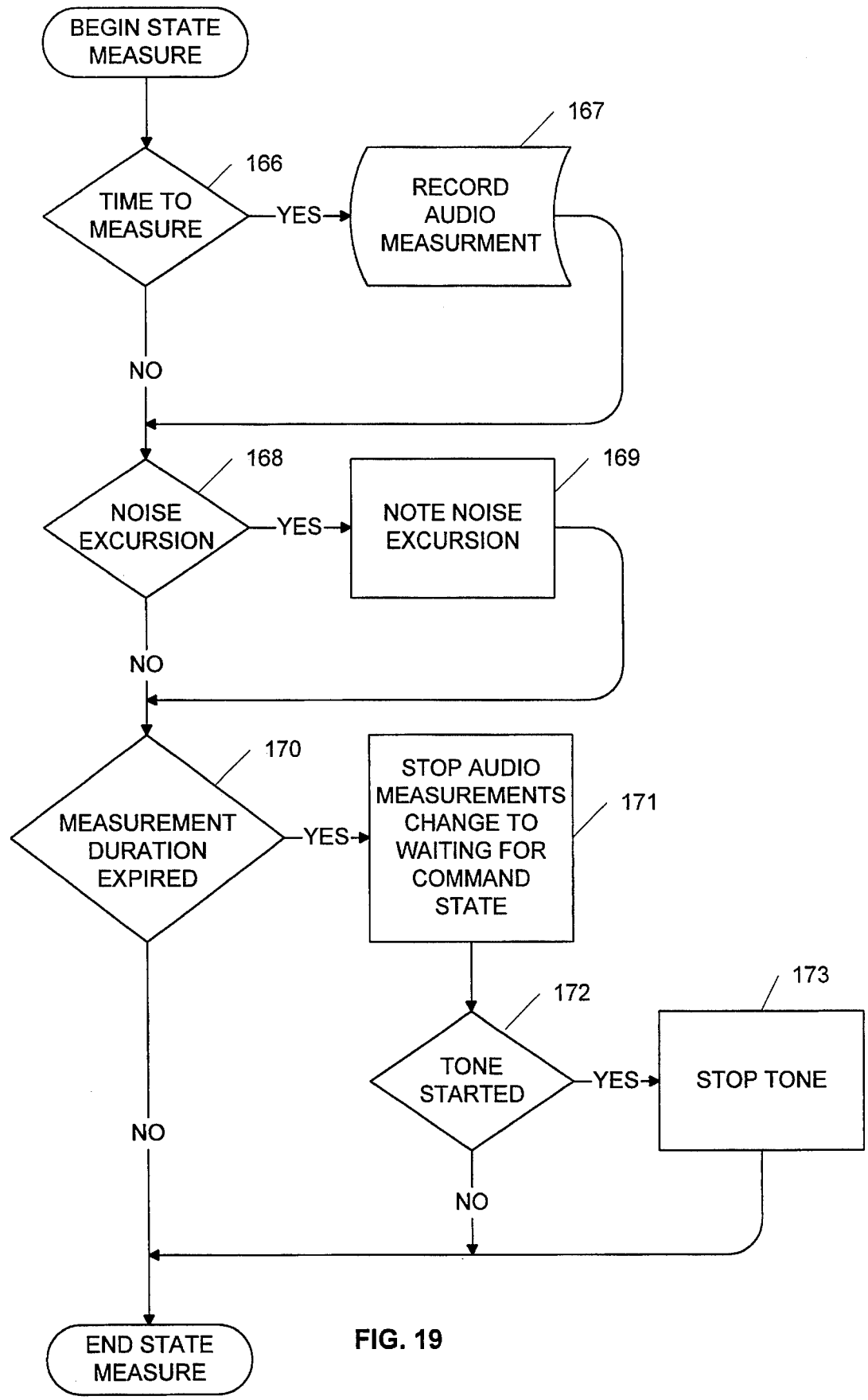
FIG. 19 shows a flow chart detailing the measure state used in the FQM system.

FIG. 19 is a flowchart detailing the processing taken by the FQM system when the phone line is in the measure state. Step 166 determines if it is time to measure, if so, then the current audio measurement is recorded 167. Step 168 determines if an audio measurement excursion has been observed. If an audio measurement excursion has been observed then this is noted by step 169 for future reference in the end call command process (see FIG. 17). Step 170 determines if the measurement duration has expired. If the measurement duration has expired then the audio measurements are stopped and the state is changed to the wait for command state in step 171. If a tone has been started as determined by step 172 then the tone is stopped by step 173.

Figure 20:
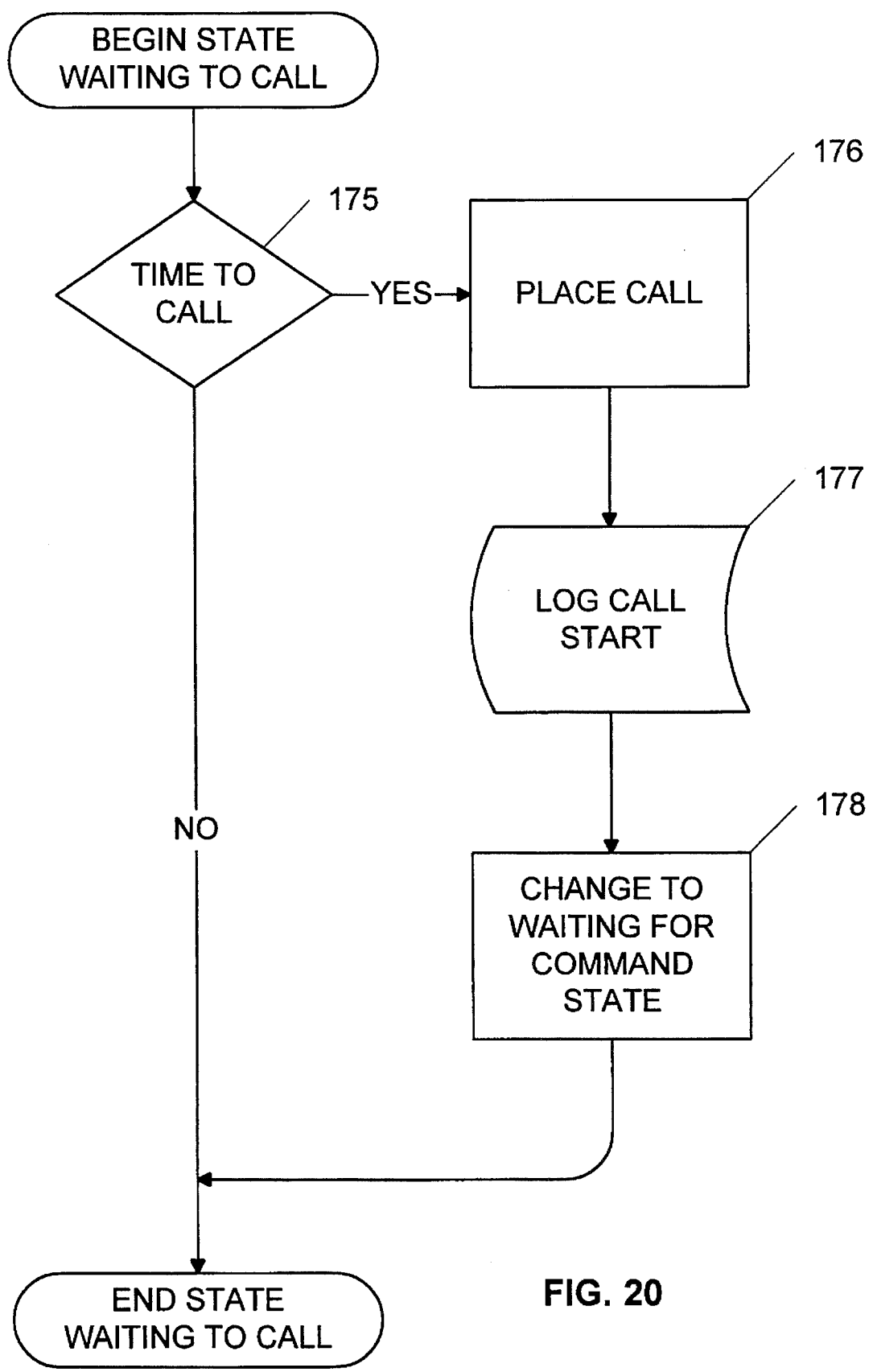
FIG. 20 shows a flow chart detailing the waiting to call state used in the FQM system.

FIG. 20 is a flowchart detailing the processing taken by the FQM system when the phone line is in the waiting to call state. If it is time to place a call as determined by step 175 then a call is placed in step 176 to the phone number extracted from the end call with call back command processing (see FIG. 18). The state of the phone line is then changed to the waiting for command state by step 177.

The OQA system takes data collected by the MQM and FQM and matches it based on the date and time of the data collection to produce statistical tables and graphs that represent the quality of service provided by the cellular radiotelephone that was exercised during the data collection process.

The OQA system can be any computer system that has the ability to read and process the data produced by the MQM and FQM systems. For this preferred embodiment the OQA system consists of software extensions that have been added into a prior art cellular data analysis tool that executes on any computer capable of running the Microsoft Windows operating environment.

Figure 25:
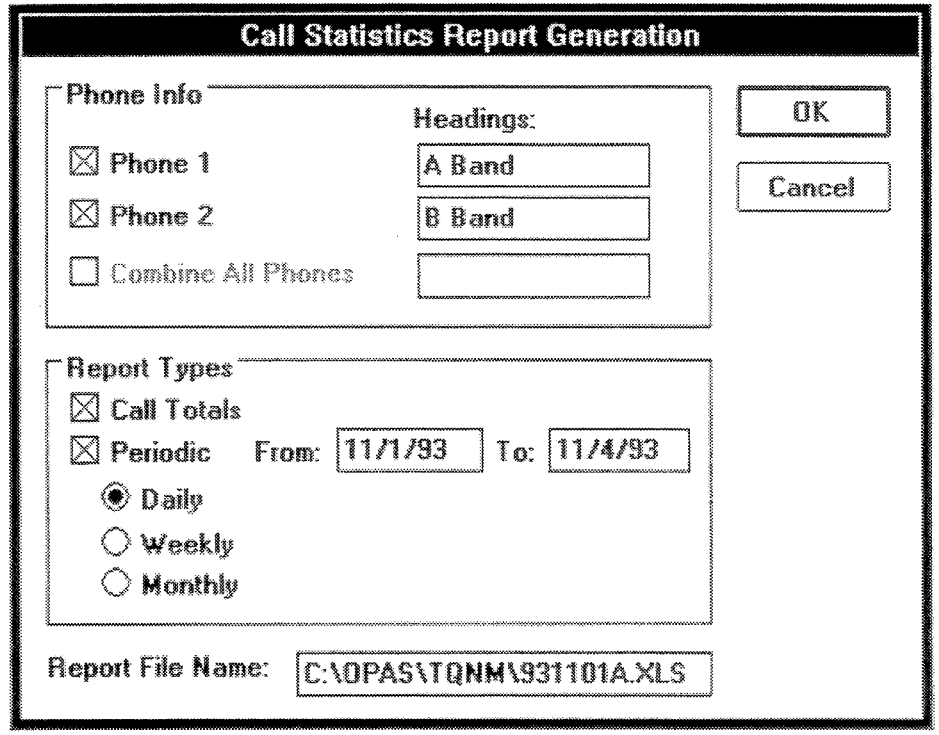
FIG. 25 shows the user interface provided by the OQA system when selecting the types of call statistic reports to be generated.

FIG. 25 is a flowchart detailing the processing taken by the OQA system when matching the data collected by the MQM and FQM systems. In step 200 the data collected by the MQM and FQM systems are manually transferred to the OQA system or in the case of the FQM system this data may be automatically transferred through a local area network. The data files are then opened by step 201. In step 201 the MQM data file in opened first. The identity of the MQM system and the date of the data collection are read from the MQM data file. This information is then used to construct the filename for the required FQM data file. The FQM data file is then opened. In steps 202, 203, 204 and 205 the matching process takes place. The result of the matching process is a updated MQM data file that contains the data collected from the MQM and FQM systems. Contained in the beginning of the MQM data file is the call statistic record that contains totals of the statistical information contained within the file. This record is later used when creating statistical tables and graphs and when multiple files are combined to form a comprehensive view of the performance of a cellular network.

In step 202 all of the data for a single call is read from the MQM data file. This data contains the call start record, the audio quality measurement records, and the call end record. In step 203 the corresponding records are located in the FQM data file. The call start records are simply used as location markers. The audio quality measurement records read from the FQM are inserted into the MQM file based on the time of collection. The call end records contain the classification of the call. For the FQM this classification can be a good call or a noisy uplink call. For the MQM the call classification can be a good call, blocked call, dropped call, ROAM call, no service call, or noisy downlink call. In addition three call classification modifiers are contained within the MQM call end record—excessive handoffs, strong or loud adjacent channel signal strength, and SAT fades. The MQM call end record is updated with the classification found in the FQM call end record. If the FQM call end record contains good call classification the MQM call end record is unchanged. If the FQM call end record contains noisy uplink call classification then the MQM call end record is marked accordingly.

In step 204 the call statistic record in the MQM data file is updated to reflect the new call statistic totals.

Step 205 repeats the process until the end of the MQM file is found.

Figure 24:
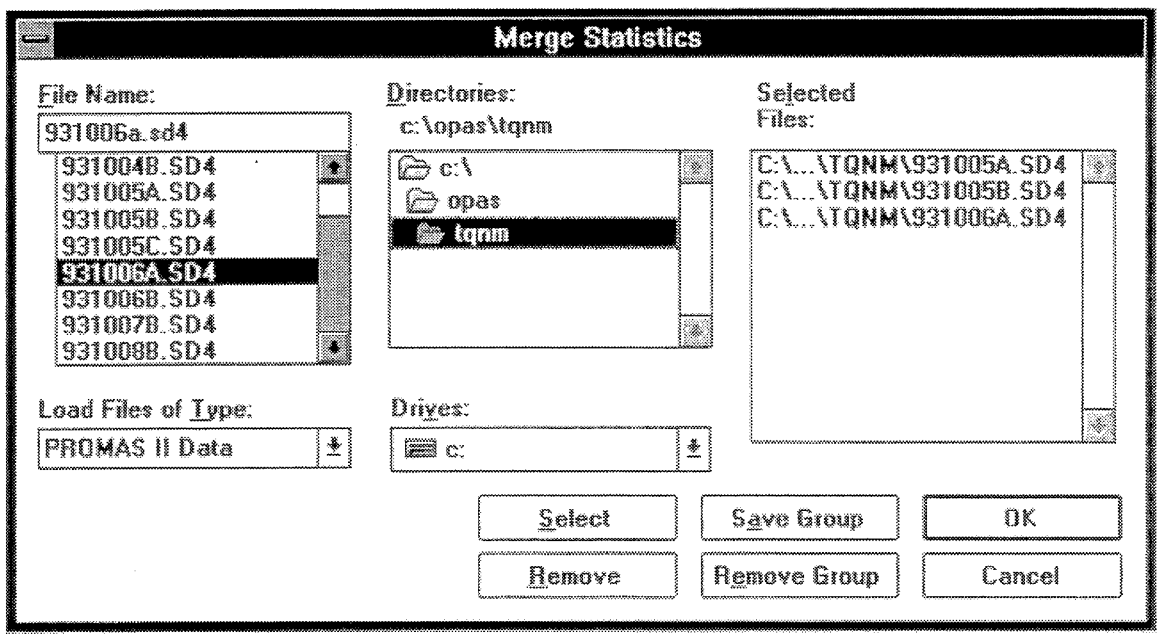
FIG. 24 shows the user interface provided by the OQA system when merging files for call statistic report generation.

One the matching process is completed one or more matched data files can be used alone or combined to create statistical tables and graphs. FIG. 24 shows the user interface provided by the OQA system for the selection of data collection files. Once the user has selected one or more data files the user interface shown in FIG. 25 is displayed allowing the user to select the types of reports to be generated. Once the report types are selected the selected files are opened, the call statistic records are combined if more than one file is selected, and the data is then used to create statistical tables and graphs as selected by the user representing the quality of service provided by the cellular system where these file were collected. For this preferred embodiment the Microsoft Excel windows applications is utilized to create the tables and graphs. This is accomplished automatically using the well known Dynamic Data Exchange (DDE) application programming interface support by the Microsoft Windows operating environment.

Figure 26B:
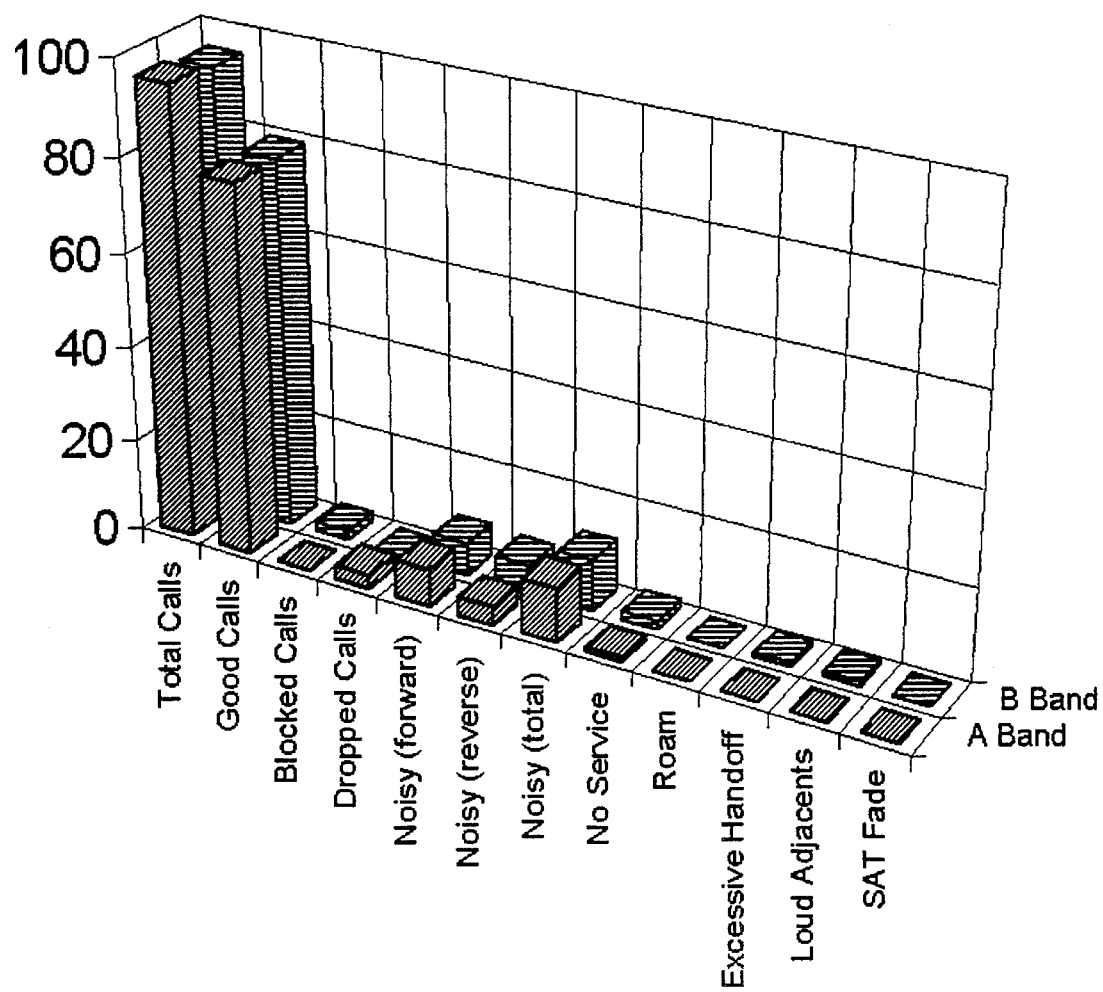
FIG. 26B shows the same information in graphical form.

FIG. 26A is a typical call totals table produced by the OQA system. FIG. 26B shows the same data in graphical form. The call totals table and graph shows the absolute total number of each call classification and call classification modifiers. The bar chart contains bars for all of the call classification and classification modifiers. This particular graph shows the comparison of the two cellular systems, 'A band' and 'B band', providing service in the area that was tested.

Figure 27B:
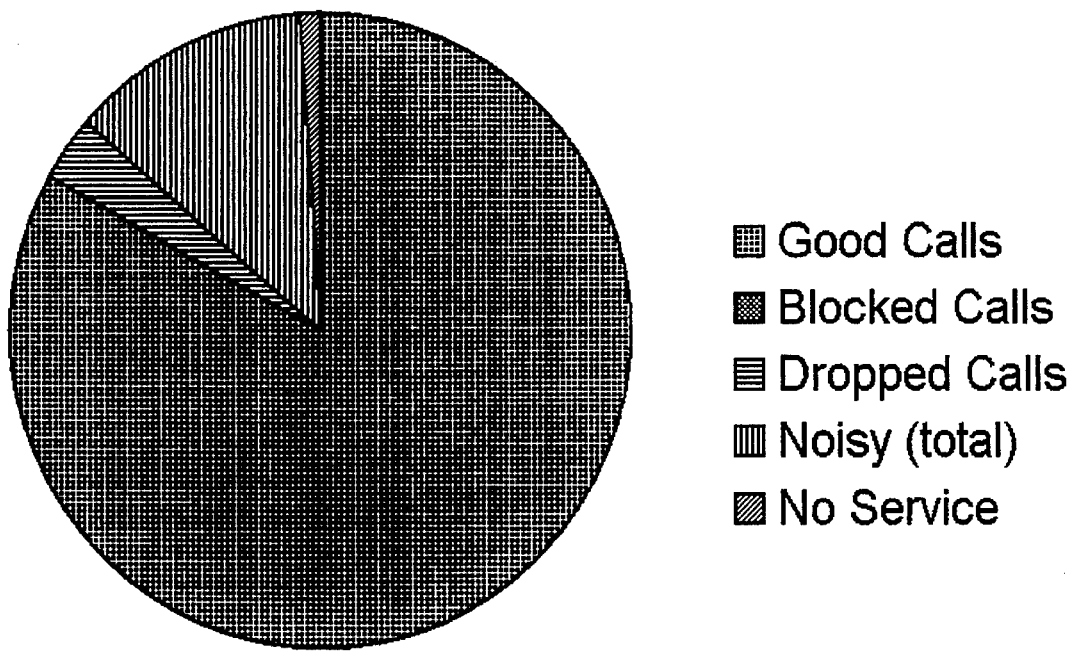
FIG. 27B shows the A Band data in graphical form.
Figure 27C:
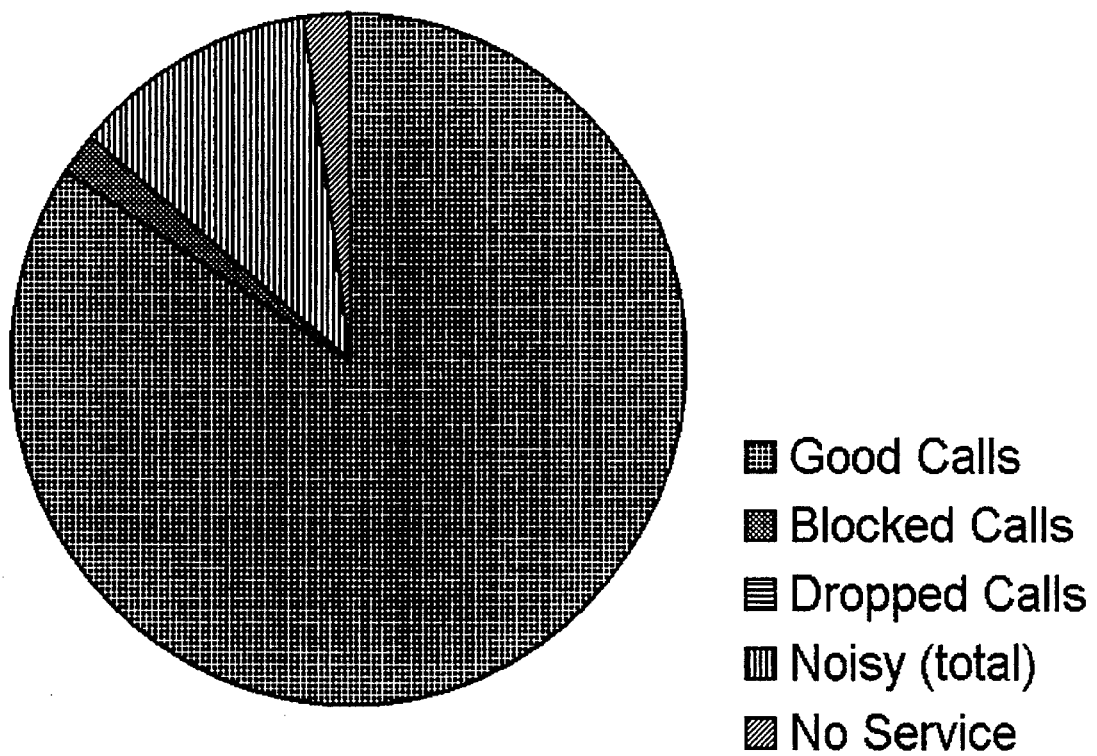
FIG. 27C shows the B Band date in graphical form.

FIG. 27A is a typical call percentages table produced by the OQA system FIG. 27B is the A Band data in graphical form. FIG. 27C is the B Band data in graphical form. The call percentages s table shows the percentage of the total number of calls for each call classification and call classification modifier. The pie chart only contains slices for each call classification. This particular graph shows the same data depicted in FIG. 25 except in percentage form.

FIG. 28 is a typical periodic table. The periodic table shows both call totals and call percentages for each call classification and call classification modifier grouped according to a specified time interval. This particular example shows the data grouped into three days. The interval could also be weeks or months.

Figure 29A:
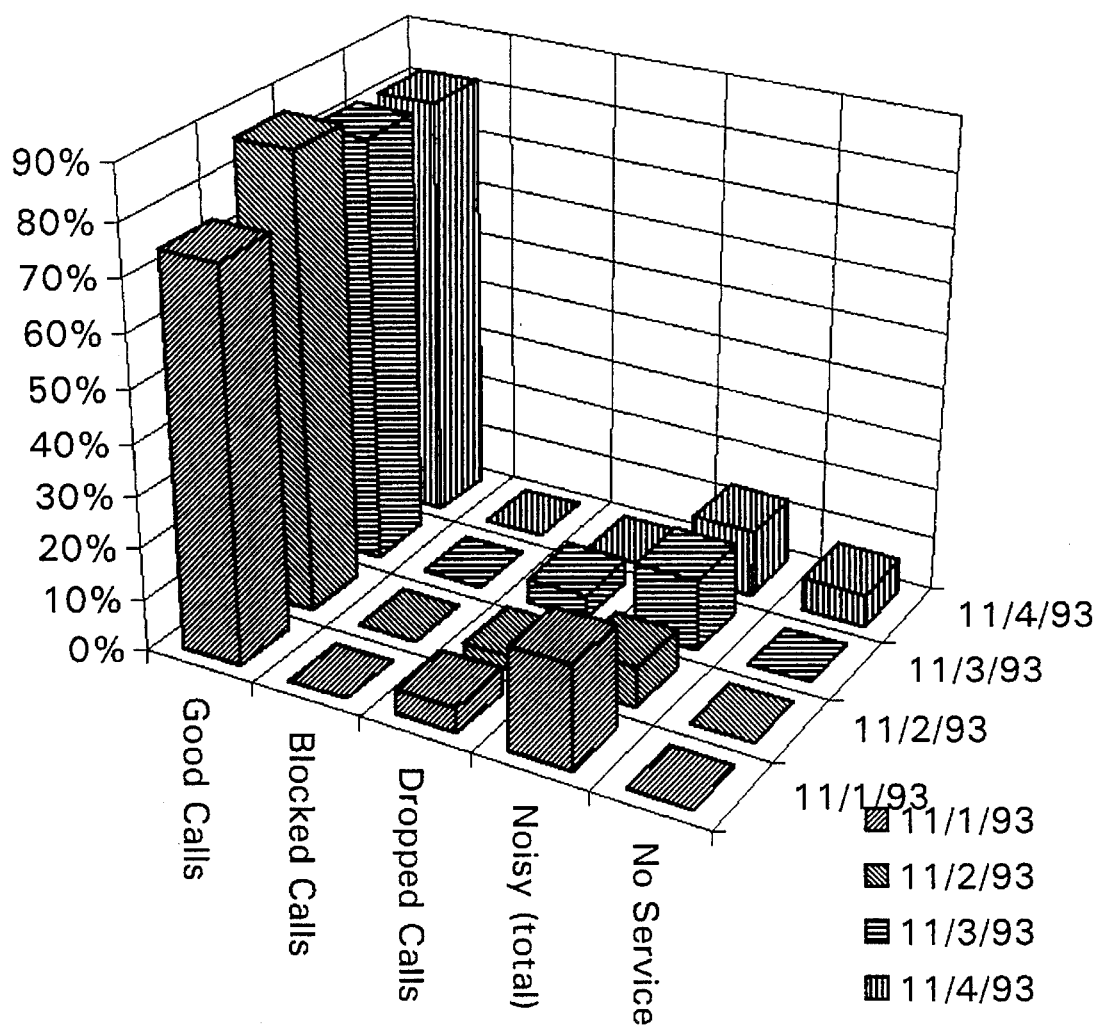
FIG. 29A shows in graphical form the periodic percentages of the A Band data of FIG. 28
Figure 29B:
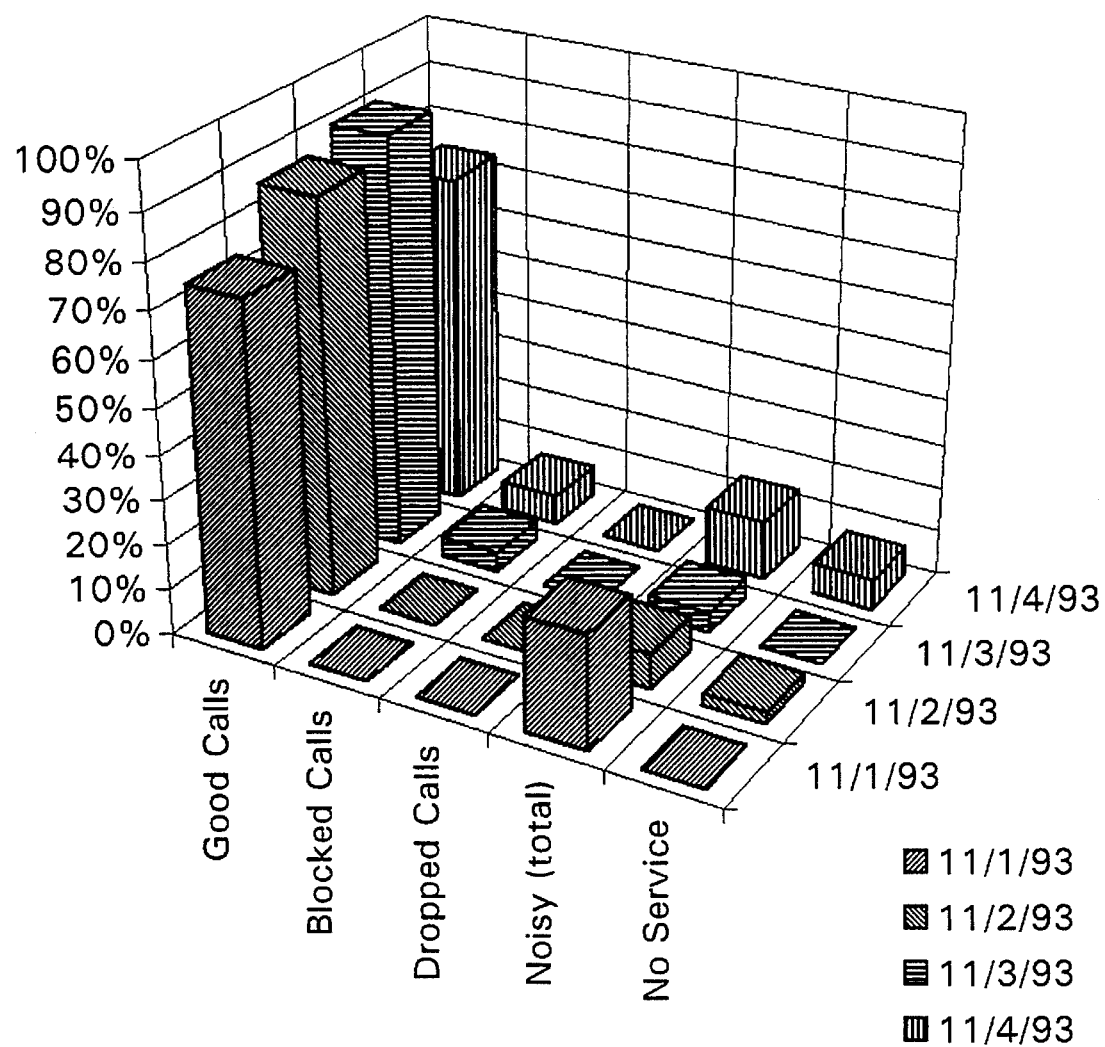
FIG. 29B shows in graphical form the periodic percentages of the B Band data of FIG. 28

FIG. 29A is a typical periodic percentages graph depicting the data from FIG. 28 for the A Band. FIG. 29B shows the data for the B Band in graphical form. The periodic percentages graph table shows both call totals for each call classification grouped according to a specified time interval. This particular example shows the data grouped into three days. The interval could also be weeks or months.

The above described preferred embodiment is merely illustrative of the principles of this invention. Structural and functional modifications can be made without departing from the scope of the invention.

TABLE A

| Phone Controller board Communication and control buffer. | | |
|---|---|---|
| Name | Byte Size | Description |
| Register 1A | 2 | Hardware Latch control registers for Board 1 |
| Register 1B | 2 | |
| Register 1C | 2 | |
| Register 1D | 1 | DTMF registers |
| Register 1E | 1 | Mux Select |
| Register 1F | 1 | Irq Register |
| Register 2A | 2 | Hardware Latch control registers for Board 2 |
| Register 2B | 2 | |
| Register 2C | 2 | |
| Register 2D | 1 | DTMF registers |
| Register 2E | 1 | Mux Select |
| Register 2F | 1 | Irq Register |
| Register 3A | 2 | Hardware Latch control registers for Board 3 |
| Register 3B | 2 | |
| Register 3C | 2 | |
| Register 3D | 1 | DTMF registers |
| Register 3E | 1 | MUX Select |
| Register 3F | 1 | Irq Register |
| Register 4A | 2 | Hardware Latch control registers for Board 4 |
| Register 4B | 2 | |
| Register 4C | 2 | |
| Register 4D | 1 | DTMF registers |
| Register 4E | 1 | Mux Select |
| Register 4F | 1 | Irq Register |
| Scratch Pad | 10 | Scratch-Pad registers for hardware ISR use. |
| FIFO Flags | 1 | FIFO Full Flag (non zero indicates full FIFO) |
| FIFO in counter | 1 | FIFO in counter |
| FIFO out counter | 1 | FIFO out counter |
| FIFO | 256 | Global data space for transfer between the Hardware ISR and FQM windows application. |

TABLE B

Phone Controller Device Driver Hardware Specific Register Descriptions

| | | |
|---|---|---|
| BD1_PORT_BASE | 0300h | FQM Board#1 I/O port base address |
| BD2_PORT_BASE | 0310h | FQM Board#2 I/O port base address |
| BD3_PORT_BASE | 0330h | FQM Board#3 I/O port base address |
| BD4_PORT_BASE | 0350h | FQM Board#4 I/O port base address |
| CS_A_OFFSET | 00h | FQM Hardware Chip Select A Offset |
| CS_B_OFFSET | 02h | FQM Hardware Chip Select B Offset |
| CS_C_OFFSET | 04h | FQM Hardware Chip Select C Offset |
| CS_D_RCVXMT_OFST | 06h | FQM Hardware Chip Select D Offset |
| CS_D_STATCTL_OFST | 07h | FQM Hardware Chip Select D+Offset |
| CS_E_OFFSET | 08h | FQM Hardware Chip Select E Offset |
| CS_F_OFFSET | 0Ah | FQM Hardware Chip Select F Offset |

Register hardware control bits are defined as follows:
Register A bits:

| | | |
|---|---|---|
| DAT_VC1 | 0000000000000001b | Data/Voice ch1 |
| OFF_HK1 | 0000000000000010b | Off Hook ch1 |
| DAT_VC2 | 0000000000000100b | Data / Voice ch2 |
| OFF_HK2 | 0000000000001000b | Off Hook ch2 |
| | 0000000000010000b | unused |
| MUXA1_A0 | 0000000000100000b | Mux Selector A Ch1 Addr line 0 |
| MUXA1_A1 | 0000000001000000b | Mux Selector A Ch1 Addr line 1 |
| MUXA1_A2 | 0000000010000000b | Mux Selector A Ch1 Addr line 2 |
| CL_RD1 | 0000000100000000b | Clear Ring Detect Interrupt Ch1 |
| CL_TD1 | 0000001000000000b | Clear Tone Detect Interrupt Ch1 |
| CL_RD2 | 0000010000000000b | Clear Ring Detect Interrupt Ch2 |
| CL_TD2 | 0000100000000000b | Clear Tone Detect Interrupt Ch2 |
| INT_EN | 0001000000000000b | FQM Hardware Interrupt Enable (A11) |
| WDOG_EN | 0010000000000000b | WatchDog Interrupt Enable |
| TICKLE | 0100000000000000b | WatchDog Tickle |
| CL_WDOG | 1000000000000000b | Clear Watch Dog Interrupt |

Register B bits:

| | | |
|---|---|---|
| LATIV2 | 0000000000000001b | Prog.sine.gen Ch2 Serial Input Latch (falling edge) |
| SID2 | 0000000000000010b | Prog.sine.gen Ch2 Serial Input Data |
| SCK2 | 0000000000000100b | Prog.sine.gen Ch2 Serial Cock (rising edge) |
| CS_AMP2A | 0000000000001000b | Prog.amp A Ch2 Chip Select (asserted low = 0) |
| UD_AMP2A | 0000000000010000b | Prog.amp A Ch2 Up(1) / Down(0) count direction |
| INC_AMP2A | 0000000000100000b | Prog.amp A Ch2 Increment, toggle 0 to 1 to move wiper |
| UD_AMP2B | 0000000001000000b | Prog.amp A Ch2 Up(1) / Down(0) count direction |
| INC_AMP2B | 0000000010000000b | Prog.amp B Ch2 Increment, toggle 0 to 1 to move wiper |
| LATIV1 | 0000000100000000b | Prog.sine.gen Ch1 Serial Input Latch (falling edge) |
| SID1 | 0000001000000000b | Prog.sine.gen Ch1 Serial Input Data |
| SCK1 | 0000010000000000b | Prog.sine.gen Ch1 Serial Clock (rising edge) |
| CS_AMP1A | 0000100000000000b | Prog.amp A Ch1 Chip Select (asserted low = 0) |
| UD_AMP1A | 0001000000000000b | Prog.amp A Ch1 Up(1) / Down(0) count direction |
| INC_AMP1A | 0010000000000000b | Prog.amp A Ch1 Increment, toggle 0 to 1 to move wiper |
| UD_AMP1B | 0100000000000000b | Prog.amp B Ch1 Up(1) / Down(0) count direction |
| INC AMP1B | 1000000000000000b | Prog.amp B Ch1 Increment, toggle 0 to 1 to move wiper |

Register C bits:

| | | |
|---|---|---|
| CS_AMP2B | 0000000000000001b | Prog.amp B Ch2 Chip Select (asserted low = 0) |
| CS_AMP2C | 0000000000000010b | Prog.amp C Ch2 Chip Select (asserted low = 0) |
| UD_AMP2C | 0000000000000100b | Prog.amp C Ch2 Up(1)/Down(0) count direction |
| INC_AMP2C | 0000000000001000b | Prog.amp C Ch2 Increment _toggle 0 to 1 to move wiper |
| CS_AMP2D | 0000000000010000b | Prog.amp D Ch2 Chip Select (asserted low = 0) |
| UD_AMP2D | 0000000000100000b | Prog.amp D Ch2 Up(1)/Down(0) count direction |
| INC_AMP2D | 0000000001000000b | Prog.amp D Ch2 Increment - toggle 0 to 1 to move wiper |
| | 0000000010000000b | unused |
| CS_AMP1B | 0000000100000000b | Prog.amp B Ch1 Chip Select (asserted low = 0) |
| CS_AMP1C | 0000001000000000b | Prog.amp C Ch1 Chip Select (asserted low = 0) |
| UD_AMP1C | 0000010000000000b | Prog.amp C Ch1 Up(1)/Down(0) count direction |
| INC_AMP1C | 0000100000000000b | Prog.amp C Ch1 Increment _toggle 0 to 1 to move wiper |
| CS_AMP1D | 0001000000000000b | Prog.amp D Ch1 Chip Select (asserted low = 0) |
| UD_AMP1D | 0010000000000000b | Prog.amp D Ch1 Up(1)/Down(0) count direction |
| INC_AMP1D | 0100000000000000b | Prog.amp D Ch1 Increment _toggle 0 to 1 to move wiper |
| | 1000000000000000b | unused |

Register D is used for communication to the DTMF chip.
The register is doubled for writing and
defined differently for reading.
DTMF Transceiver Control Register A bits:

| | | |
|---|---|---|
| TONE_OUT1 | 00000001b | logic 1 Enables tone output for Ch1 |
| CP_DTMF1 | 00000010b | 0 = DTMF mode - 1 = call progress (CP) mode for Ch1 |
| DTMF_INT_EN1 | 00000100b | 1 = Enables interrupt mode for Ch1 |
| REG_SEL1 | 00001000b | 1 = select reg.B on next write for Ch1 |
| TONE_OUT2 | 00010000b | logic 1 Enables tone output for Ch2 |
| CP_DTMF2 | 00100000b | 0 = DTMF mode - 1 = call progress (CP) mode for Ch2 |

TABLE B-continued

| | | |
|---|---|---|
| DTMF_INT_EN2 | 01000000b | 1 = Enables interrupt mode for Ch2 |
| REQ_SEL2 | 10000000b | 1 = select reg.B on next write for Ch2 |
| DTMF Transceiver Control Register B bits: | | |
| BURST_MODE1 | 00000001b | 0 = Enables BLJRST Mode for Ch1 |
| TEST_MODE1 | 00000010b | 1 = Enables TEST Mode for Ch1 |
| SGL_DTMF_TONE1 | 00000100b | 0 = DTMF tone gen for Ch1 - 1 = Singletone gen for Ch1 |
| COL_ROW_TONES1 | 00001000b | 0 = sgl ROW freq for Ch1 1 = sgl Column freq for Ch1 |
| BURST_MODE2 | 00010000b | 0 = Enables BLJRST Mode for Ch2 |
| TEST_MODE2 | 00100000b | 1 = Enables TEST Mode for Ch2 |
| SGL_DUAL_TONE2 | 01000000b | 0 = DTMF tone gen for Ch2 - 1 = Single tone gen of Ch2 |
| COL_ROW_TONES2 | 10000000b | 0 = sgl ROW freq for Ch2 _I=sgl Column freq for Ch2 |
| DTMF Transceiver Status Register bits: | | |
| DTMF_INT_OCUR1 | 00000001b | 1 = Int has occurred Cleared on read Ch1 |
| XMT_REG_EMPTY1 | 00000010b | *1 = Xmt ready for data cleared on read Ch1 |
| RCV_REG_FULL1 | 00000100b | *0 = Valid data in Rcv reg cleared on read Ch1 |
| _DELYD_STER1 | 00001000b | 0 = Valid DTMF sig 1 = absent DTMF sig Ch1 |
| DTMF_INT_OCUR2 | 00010000b | 1 = Int has occurred Cleared on read Ch2 |
| XMT_REG_EMPTY2 | 00100000b | *1 = Xmt ready for data cleared on read Ch2 |
| RCV_REG_FULL2 | 01000000b | *0 = Valid data in Rcv reg cleared on read Ch2 |
| _DELYD_STER2 | 10000000b | 0 = Valid DTMF sig 1 = absent DTMF sig Ch2 |
| Register E bits: | | |
| MUXA2_A0 | 00000001b | Mux Selector A Ch2 Addr line 0 |
| MUXA2_A1 | 00000010b | Mux Selector A Ch2 Addr line 1 |
| MUXA2_A2 | 00000100b | Mux Selector A Ch2 Addr line 2 |
| MUXB1_A0 | 00001000b | Mux Selector B Ch1 Addr line 0 |
| MUXB1_A1 | 00010000b | Mux Selector B Ch1 Addr line 1 |
| MUXB2_A0 | 00100000b | Mux Selector B Ch2 Addr line 0 |
| MUXB2_A1 | 01000000b | Mux Selector B Ch2 Addr line 1 |
| | 110000000b | unused |
| Register F FQM Hardware Interrupt Controller Bits Read Only | | |
| TIM_OUT | 00000001b | Watch Dog Timeout Interrupt |
| RING_DET1 | 00000010b | Ring Detect Interrupt Ch1 |
| TONE_DET1 | 00000100b | DTMF Detect Interrupt Ch1 |
| RING_DET2 | 00001000b | Ring Detect Interrupt Ch2 |
| TONE_DET2 | 00010000b | DTMF Detect Interrupt Ch2 |

TABLE C

The following commands are sent from the MQM to the FQM.
  Identify
  Measure
  Terminate call
  Terminate call with call back
The following commands are sent from the FQM to the MQM.
  Positive Acknowledge
  Negative Acknowledge
All sixteen DTMF digits will be used for communications. The digits 0-9,# and * will be used
for data transmission. The digits A-D will have special meaning as described below.

| DTMF Digit | Description |
|---|---|
| A | Start of Message |
| B | End of Message |
| C | Field Separator |
| D | Reserved for future use |

Messages will be sent between the MQM and the FQM via DTMF message packets. The
following sections describe each message packet.
Identify Command

| Description | Number of DTMF Digits | Valid Values |
|---|---|---|
| Message Start | 1 | A |
| Message Number | 1 | 1 |
| Unit number | 1 | 0-9 |
| Device Number | 1 | 0-9 |
| Time | 6 | Time HHMMSS |
| Checksum | 1 | 0-9 |
| Message End | 1 | B |

Message Start
  All messages will begin with the A character.
Command
  The command number 1

TABLE C-continued

Unit Number
   The unit number of the MQM system.
Device Number
   The Device number within the MQM system.
Time
   The MQM time.
Checksum
   The mod 10 addition of all preceding fields. The message start character, the message
   end character and the checksum are not included in the checksum calculation.
Message End
   All messages end with the B character.

Measure Noise

This command starts the noise measuring process.

| Description | Number of DTMF Digits | Valid Values |
|---|---|---|
| Message Start | 1 | A |
| Command | 1 | 2 |
| Measurement type | 1 | 1 - Sinad |
| | | 2 - C Message |
| | | 3 - C Notch |
| | | 4 - C Sinad |
| | | 5 - Notch |
| | | 6 - Unity |
| Sample Size | 4 | 1–9999 |
| | | mSeconds |
| Noise Threshold | 3 | 0–999 |
| Noise Threshold Reset | 3 | 0–999 |
| Data Storage Speed | 1 | 1–9 |
| Measurement Duration | 3 | 30–999 Seconds. |
| Checksum | 1 | 0–9 |
| Message End | 1 | B |

Message Start
   All messages will begin with the A character.
Command
   The current command 2.
Measurement type
   1 - Sinad, 2 - C Message, 3 C Notched Noise, 4 C weighted Sinad, 5 - Notch, or 6 -
   Unity output
Sample Size
   The number of milliseconds to monitor noise for noise statistics.
Noise Threshold
   Noise Threshold used for spike detection and noisy call determination.
Noise Threshold Reset
   Noise Threshold reset is used to provide a hysteresis for noise monitoring.
Data storage Speed
   The number of seconds between data recordings.
Measurement Duration
   The number of seconds to monitor noise. During this period the FQM system will not
   respond to any commands.
Checksum
   The mod 10 addition of all preceding fields. The message start character, the message
   end character and the checksum are not included in the checksum calculation.
Message End
   All messages end with the B character.

Terminate Call

This command terminates the current call.

| Description | Number of DTMF Digits | Valid Values |
|---|---|---|
| Message Start | 1 | A |
| Command | 1 | 3 |
| Message End | 1 | B |

Message Start
   All messages will begin with the A character.
Command
   The current command 3.
Message End
   All messages end with the B character.

Terminate Call with Call Back
This command instructs the FQM system to end the current call and to call the MQM system
back a configurable number of seconds later.

| Description | Number of DTMF Digits | Valid Values |
|---|---|---|
| Message Start | 1 | A |
| Command | 1 | 4 |
| Seconds for call back | 2–4 | 30–9999 |

TABLE C-continued

| | | |
|---|---|---|
| Field Separator | 1 | C |
| Phone Number | 1-32 | 0-9,*,# |
| Field Separator | 1 | C |
| Checksum | 1 | 0-9 |
| Message End | 1 | B |

Message Start
    All messages will begin with the A character.
Command
    The current command 4.
Seconds for call back
    Defines the number of seconds after termination before the FQM system calls the MQM system.
Field Separator
    A field separator follows each variable length field.
Phone Number
    Phone number used for callback.
Field Separator
    A field separator follows each variable length field.
Checksum
    The mod 10 addition of all preceding fields. The message start character, the message end character and the checksum are not included in the checksum calculation.
Message End
    All messages end with the B character.

Positive Acknowledge

This message is sent only by the FQM system. This message indicates that the FQM received the previous message without error.

| Description | Number of DTMF Digits | Valid Values |
|---|---|---|
| Message Start | 1 | A |
| Command | 1 | 8 |
| Message End | 1 | B |

Message Start
    All messages will begin with the A character.
Command
    The current command 8.
Message End
    All messages end with the B character.

Negative Acknowledge

This message is sent only by the FQM system. The FQM sends this message when an invalid message is detected either by checksum error or length error. When the MQM receives this message the MQM should re transmit the last message.

| Description | Number of DTMF Digits | Valid Values |
|---|---|---|
| Message Start | 1 | A |
| Command | 9 | |
| Message End | 1 | B |

Message Start
    All messages will begin with the A character.
Command
    The current command 9.
Message End
    All messages end with the B character.

TABLE D

Shared Memory between DSP and Controller, The sizes are in 32-bit words.

| Description | Size |
|---|---|
| VME Access Flag | 1 |
| Sample Size | 1 |
| CHANNEL 1 - Filter Enable Mask | 1 |
| CHANNEL 2 - Filter Enable Mask | 1 |
| CHANNEL 3 - Filter Enable Mask | 1 |
| CHANNEL 4 - Filter Enable Mask | 1 |
| DSP Health Status | 1 |
| Revision Number | 1 |
| RESERVED | 8 |
| Tone Generation Period (All Channels) | 1 |
| Tone Generation Table Size (All Channels) | 1 |
| CHAN 1 - Tone Generation Amplitude | 1 |
| CHAN 2 - Tone Generation Amplitude | 1 |
| CHAN 3 - Tone Generation Amplitude | 1 |
| CHAN 4 - Tone Generation Amplitude | 1 |
| CHAN 1 - Direct A/D Output | 1 |
| CHAN 2 - Direct A/D Output | 1 |
| CHAN 3 - Direct A/D Output | 1 |
| CHAN 4 - Direct A/D Output | 1 |
| RESERVED | 6 |
| CHAN 1 - Noise Threshold | 1 |
| CHAN 1 - Noise Reset Threshold | 1 |

TABLE D-continued

Shared Memory between DSP and Controller, The sizes are in 32-bit words.

| Description | Size |
| --- | --- |
| CHAN 2 - Noise Threshold | 1 |
| CHAN 2 - Noise Reset Threshold | 1 |
| CHAN 3 - Noise Threshold | 1 |
| CHAN 3 - Noise Reset Threshold | 1 |
| CHAN 4 - Noise Threshold | 1 |
| CHAN 4 - Noise Reset Threshold | 1 |
| RESERVED | 18 |
| CHAN 1 Data Block | 96 |
| CHAN 2 Data Block | 96 |
| CHAN 3 Data Block | 96 |
| CHAN 4 Data Block | 96 |
| CHAN 1 DTMF/Call Progress Block | 144 |
| CHAN 2 DTMF/Call Progress Block | 144 |
| CHAN 3 DTMF/Call Progress Block | 144 |
| CHAN 4 DTMF/Call Progress Block | 144 |
| The format of the Channel Filter Data Blocks: | |
| Average | 1 |
| Maximum | 1 |
| Minimum | 1 |
| Standard Deviation | 1 |
| 10th Percentile | 1 |
| 50th Percentile | 1 |
| 90th Percentile | 1 |
| RESERVED | 1 |
| Noise Threshold Data Buffer 1 | 7 |
| Noise Threshold Data Buffer 2 | 7 |
| Noise Threshold Data Buffer 3 | 7 |
| Noise Threshold Data Buffer 4 | 7 |
| Noise Threshold Data Buffer 5 | 7 |
| Noise Threshold Data Buffer 6 | 7 |
| Noise Threshold Data Buffer 7 | 7 |
| Noise Threshold Data Buffer 8 | 7 |
| Noise Threshold Data Buffer 9 | 7 |
| Noise Threshold Data Buffer 10 | 7 |
| RESERVED | 18 |
| Noise Threshold Data Buffer Format: | |
| Average | 1 |
| Maximum | 1 |
| Minimum | 1 |
| Standard Deviation | 1 |
| 10th Percentile | 1 |
| 50th Percentile | 1 |
| 190th Percentile | |
| DTMF/Call Progress Data Block Format: | |
| Call Progress Status | 1 |
| DTMF Receive Status | 1 |
| DTMF Send Count | 1 |
| RESERVED | 13 |
| DTMF Send Buffer | 64 |
| DTMF Receive Buffer | 164 |

What is claimed is:

1. An automated system for assessing the quality of service determined by call progress monitoring and audio clarity measurements provided by a cellular radiotelephone system having a Mobile Telephone Switching Office (MTSO) connected to a Public Switched Telephone Network (PSTN) and uplink and downlink communication channels establishing communications between mobile and fixed stations in the radiotelephone system by transmitted audio modulated carrier signals, comprising a mobile station having a cellular radiotelephone controller and one or more cellular radiotelephones controlled by the controller, a fixed station connected to either the MTSO or PSTN that receives commands for configuration and control from the mobile station on an uplink channel, means included within the mobile station for automatically placing and receiving cellular radiotelephone calls to and from the fixed station, means included within the mobile station for remotely controlling and configuring the fixed station through an uplink channel, means included within the fixed station for automatically receiving telephone calls from the mobile station and upon direction from the mobile station placing a call to the mobile station, means for concurrently transmitting between the mobile station and the fixed station a first audio modulating tone on an uplink channel carrier signal and a different audio modulating tone on the downlink channel carrier signal, means included within the mobile station and the fixed station to measure simultaneously audio quality by measuring after demodulation the audio signal level, audio noise level and distortion of the audio signal received at each station for both the uplink and downlink channels of the cellular radiotelephone system by which the mobile and fixed stations communicate with one another, and means included within the mobile station and the fixed station for determining and recording the call progress of the downlink channel and the uplink channel utilized for communication for each cellular radiotelephone call.

2. The automated sustem for assessing the quality of service provided by a cellular radiotelephone system of claim 1 in which the control and configuration of the fixed station is reliably performed utilizing commands sent as a series of Dual-Tone Multi-Frequency (DTMF) digits sent between the mobile station and the fixed station that are acknowledged if correctly received or negatively acknowledged if received incorrectly by the fixed station using the uplink and downlink channels of the cellular radiotelephone system.

3. The automated system for assessing the quality of service provided by a cellular radiotelephone system of claim 2, comprising means for establishing a time and date reference for the mobile station, and means for recording data at the fixed station in the time and date reference of the mobile station.

4. The automated system for assessing the quality of service provided by a cellular radiotelephone system of claim 3, comprising means for combining the data recorded by the mobile station and the fixed station by comparing the date and time of the data recordings and inserting the data recorded at the fixed station into the data collected at the mobile station in appropriate time slots creating a comprehensive data recording representing the data collected at both the fixed and mobile stations.

5. The automated system for assessing the quality of service provided by a cellular radiotelephone system of claim 4, comprising means for creating statistical tables and graphs of the combined data recorded by the mobile station and the fixed station.

6. The automated system for assessing the quality of service provided by a cellular radiotelephone system of claim 1, comprising means for comparing the quality of service provided by differing cellular radiotelephone technology types by placing cellular radiotelephone calls in close time relationship on each of the differing cellular radiotelephone networks including analog to analog, analog to digital, or digital to digital utilizing a plurality of cellular radiotelephones contained within the same mobile unit 7. The automated system for assessing the quality of service provided by a cellular radiotelephone system of claim 1, comprising means for enhanced audio quality measurements which allows simultaneous measurements in both the forward and reverse channel paths of a cellular radiotelephone call.

8. A method for obtaining simultaneous measurements of audio quality relating to the audio signal level, audio noise level and audio distortion level of the audio signal after demodulation in both the voice uplink and downlink carrier signals of a cellular radiotelephone call between a mobile station and a fixed station which are placed in a communication link with one another by a supervisory audio tone, comprising the steps of:

concurrently transmitting a first test audio modulating tone on the uplink channel carrier signal and a different test audio modulating tone on the downlink channel carrier signal both of which audio modulating tones are at lower audio frequencies than the supervisory audio tone, removing by filtering from both of the received audio signal tones any portion of the transmitted audio tone which is echoed back from each of the receiving stations to each of the transmitting stations, and performing at each of the fixed and mobile stations independent simultaneous audio quality measurements which relate to audio signal level, audio noise level and audio distortion level of the audio test signal received at that station.

9. The method for obtaining simultaneous measurements of audio quality of claim 8 in which the independent audio quality measurements are performed by a SINAD measurement technique accomplished by the formula $$SINAD = 20\log \frac{signal + noise + distortion}{noise + distortion}$$

where the terms signal, noise, and distortion all relate to audio signal levels after demodulation.

10. The method for obtaining simultaneous measurement of audio quality of claim 9 in which the independent audio quality measurements are performed by a C message weighted SINAD measurement technique.

11. The method for obtaining simultaneous measurements of audio quality of claim 8 in which the independent audio quality measurements are performed by a C weighted notched noise measurement technique.

12. The method of claim 8 including call progress monitoring, comprising the steps of:

(a) monitoring a cellular radiotelephone call between the fixed and mobile stations for service indication, and if no service indication is present the call progress is identified as a no service call, otherwise proceed to step (b);

(b) monitoring the cellular radiotelephone call for ROAM indication, and if ROAM indication is present then the call progress is identified as a ROAM call, otherwise proceed to step (c);

(c) placing a radiotelephone call and monitoring the cellular radiotelephone call for a voice channel assignment, and if a voice channel is not assigned to the attempted cellular radiotelephone call within a specified time call progress is identified as a blocked call, otherwise proceed to step (d);

(d) effecting audio quality measurements for a predefined time interval, and if during the audio quality measurement period the call is prematurely terminated then the call progress is identified as a dropped call, otherwise proceed to step (e); and (e) terminating the cellular radiotelephone call, and if the noise measurements made during step (d) exceed a measurement threshold then the call progress is identified as a noisy call, and if during the call of step (d) SAT fades are observed the cell progress is identified as a call with SAT fades, and if during the call of step (d) excessive handoffs are observed the cell progress is identified as a call with excessive handoffs, and if during the call of step (d) strong signal strengths are observed on the adjacent channels the call progress is identified as a call with loud adjacent channels, otherwise the call progress is identified as a good call.

\* \* \* \* \*